(12) United States Patent
Suzuki et al.

(10) Patent No.: US 11,388,302 B2
(45) Date of Patent: Jul. 12, 2022

(54) IMAGE FORMING APPARATUS

(71) Applicant: CANON KABUSHIKI KAISHA, Tokyo (JP)

(72) Inventors: Yohei Suzuki, Shizuoka (JP); Junichi Ochi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/234,970

(22) Filed: Apr. 20, 2021

(65) Prior Publication Data

US 2021/0344808 A1 Nov. 4, 2021

(30) Foreign Application Priority Data

Apr. 30, 2020 (JP) .............................. JP2020-080363
Apr. 2, 2021 (JP) .............................. JP2021-063469

(51) Int. Cl.
*H04N 1/00* (2006.01)

(52) U.S. Cl.
CPC ..... *H04N 1/00612* (2013.01); *H04N 1/00602* (2013.01); *H04N 1/00806* (2013.01)

(58) Field of Classification Search
CPC ........... H04N 1/00557; H04N 1/00615; H04N 1/00795; H04N 2201/0094; H04N 1/00891; H04N 1/00904; H04N 1/00559; H04N 1/0032; H04N 1/00323; H04N 1/00549; H04N 1/00554; H04N 1/00618; H04N 1/0066; H04N 1/00806; H04N 1/00822; H04N 1/00885; H04N 1/00888; H04N 1/00896; H04N 1/00899; H04N 1/00976; H04N 1/028; H04N 1/58; H04N 5/332; H04N 5/3694; H04N 1/00541; H04N 1/1061; H04N 1/19594; H04N 2201/0081; H04N 2201/0084; B65H 2511/13; B65H 2511/212; B65H 2220/01; B65H 2220/02; B65H 2404/6111; B65H 2404/7414; B65H 2515/82; B65H 2601/521; B65H 5/062;
(Continued)

(56) References Cited

U.S. PATENT DOCUMENTS 6,721,074 B1 * 4/2004 Kao ..................... H04N 1/2032
                                                         271/160
9,650,221 B2 * 5/2017 Kawamata ............. B65H 9/008
(Continued)

FOREIGN PATENT DOCUMENTS

JP      2017-146487 A      8/2017

*Primary Examiner* — Negussie Worku
(74) *Attorney, Agent, or Firm* — Venable LLP

(57) ABSTRACT

An image forming apparatus includes an image forming unit provided on a first conveyance path, and a reading unit provided on a second conveyance path and configured to read image information from a sheet conveyed in the second conveyance path, with the second conveyance path branching from the first conveyance path. The sheet is conveyed through the second conveyance path in a case of forming an image on a second surface of the sheet opposite to a first surface of the sheet on which an image has been formed by the image forming unit. In addition, an opposing member opposes the reading unit with a space therebetween, and a conveyance roller conveys the sheet through the space between the reading unit and the opposing member and is rotatably supported by the opposing member.

22 Claims, 16 Drawing Sheets

(58) Field of Classification Search
CPC .. B65H 5/36; G03G 15/5004; G03G 15/5016; G03G 15/602; G03G 15/6529; G03G 15/80; G03G 2215/00679
USPC .......................................................... 358/498
See application file for complete search history.

(56) References Cited

U.S. PATENT DOCUMENTS

| | | | |
|---|---|---|---|
| 10,142,515 B2 | 11/2018 | Nishizawa et al. | |
| 10,689,222 B2* | 6/2020 | Yoneyama | B65H 45/14 |
| 11,054,774 B2* | 7/2021 | Takahashi | G03G 15/2057 |
| 2009/0251744 A1* | 10/2009 | Tokutsu | H04N 1/0057 |
| | | | 358/498 |
| 2012/0218610 A1* | 8/2012 | Kunii | H04N 1/2032 |
| | | | 358/445 |
| 2013/0003138 A1* | 1/2013 | Sugizaki | H04N 1/00602 |
| | | | 358/461 |
| 2013/0193632 A1* | 8/2013 | Hida | B65H 3/0684 |
| | | | 271/10.11 |
| 2013/0293936 A1* | 11/2013 | Arakawa | H04N 1/00578 |
| | | | 358/498 |
| 2013/0293937 A1* | 11/2013 | Kato | H04N 1/00575 |
| | | | 358/498 |
| 2017/0244862 A1 | 8/2017 | Nishizawa et al. | |
| 2017/0305712 A1* | 10/2017 | Ogata | B65H 43/00 |
| 2021/0099594 A1* | 4/2021 | Ochi | H04N 1/00795 |
| 2021/0173332 A1 | 6/2021 | Koyama et al. | |

* cited by examiner

IMAGE FORMING APPARATUS

BACKGROUND OF THE INVENTION

Field of the Invention

The present invention relates to an image forming apparatus that forms an image on a sheet.

Description of the Related Art

Some image forming apparatuses such as printers, copiers, multifunctional apparatuses, and so forth include an image reading apparatus that reads an image from a sheet that is being conveyed. For example, in copiers, an image reading apparatus that reads a document image while conveying a document by an auto document feeder (ADF) is known. In addition, Japanese Patent Laid-Open No. 2017-146487 discloses disposing a reading unit in a duplex conveyance path for duplex printing and automatically identifying an abnormal image by using a reading unit subsequently to an image forming operation on a recording medium.

Incidentally, in an image reading apparatus that reads an image from a sheet that is being conveyed, the precision of a read image is affected by the position of an opposing member opposing a reading unit and the position of a conveyance roller that conveys the sheet toward a space between the reading unit and the opposing member. That is, in the case where the conveyance roller is displaced from an appropriate position with respect to the conveyance space between the reading unit and the opposing member, there is a possibility that the sheet cannot stably pass through the conveyance space and thus the precision of the read image is degraded.

SUMMARY OF THE INVENTION

The present invention provides an image forming apparatus capable of improving precision of a read image.

According to one aspect of the invention, an image forming apparatus includes an image forming unit provided on a first conveyance path and configured to form an image on a sheet conveyed through the first conveyance path, a reading unit provided on a second conveyance path and configured to read image information from the sheet conveyed through the second conveyance path, the second conveyance path branching from the first conveyance path, the sheet being conveyed through the second conveyance path in a case of forming an image on a second surface of the sheet opposite to a first surface of the sheet on which an image has been formed by the image forming unit, an opposing member configured to oppose the reading unit with a space therebetween, and a conveyance roller configured to convey the sheet through the space between the reading unit and the opposing member and rotatably supported by the opposing member.

According to another aspect of the invention, an image forming apparatus includes an image forming unit provided on a first conveyance path and configured to form an image on a sheet conveyed through the first conveyance path, a reading unit provided on a second conveyance path and configured to read image information from the sheet conveyed from the first conveyance path to the second conveyance path, the second conveyance path branching from the first conveyance path, an opposing member configured to oppose the reading unit with a space therebetween, and a conveyance roller configured to convey the sheet through the space between the reading unit and the opposing member and rotate about a roller shaft supported by a casing of the image forming apparatus, wherein the opposing member is positioned with respect to the roller shaft.

Further features of the present invention will become apparent from the following description of exemplary embodiments with reference to the attached drawings.

DESCRIPTION OF THE EMBODIMENTS

Exemplary embodiments of the present disclosure will be described below with reference to drawings.

Although a plurality of features are described for the following embodiments, not all of the plurality of features are necessarily essential, and the plurality of features may be combined arbitrarily. Further, the same or substantially the same elements are denoted by the same reference signs in the attached drawings, and redundant description thereof will be omitted. To be noted, in some drawings, three arrows respectively indicating an x direction, a y direction, and a z direction are illustrated. These will be useful for grasping the positions of the members.

First Embodiment

1. Image Forming Apparatus

Figure 1:
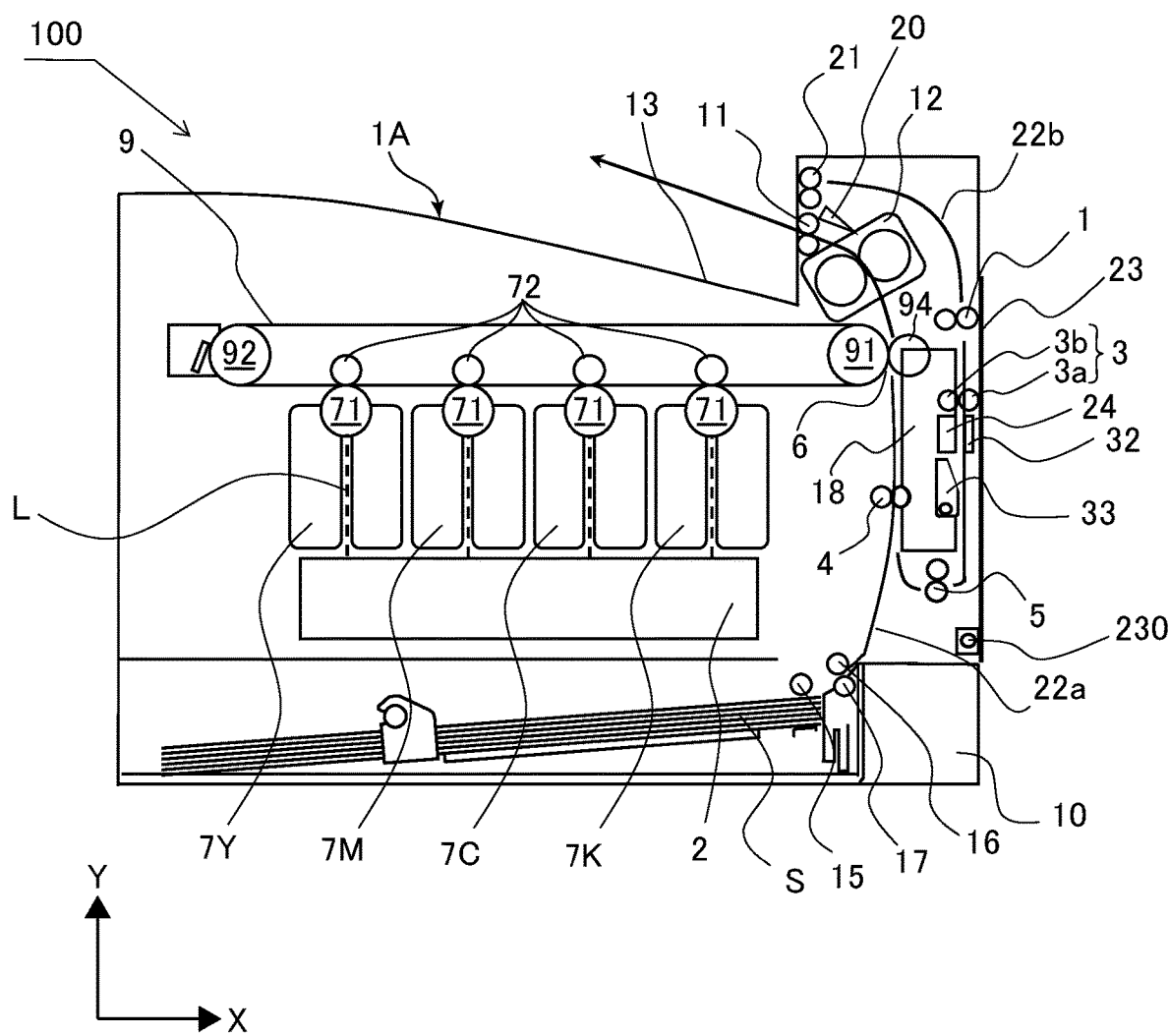
FIG. 1 is a schematic view of an image forming apparatus according to a first embodiment.

FIG. 1 is a schematic section view of an image forming apparatus 100 according to a first embodiment. Although an electrophotographic system is employed as an image formation system of an image forming unit herein, an inkjet system may be alternatively employed. In addition, the present technique is applicable not only to a full-color printer but also to a monochromatic printer. In addition, the image forming apparatus is not limited to a printer that performs printing on the basis of image information input from the outside, and may be a copier having a copying function or a multifunctional apparatus having multiple functions.

In the drawings, the z direction represents the vertical direction in the case where the image forming apparatus 100 is placed on a horizontal surface, and particularly, an upward direction is referred to as a +z direction and a downward direction is referred to as a −z direction. The y direction is a main scanning direction for image formation, and substantially coincides with the sheet width direction of a sheet conveyed in the image forming apparatus 100. In addition, the y direction is also a main scanning direction of a reading unit 24 that will be described later. The x direction is a direction intersecting with the z direction and the y direction, and is preferably a horizontal direction perpendicular to the z direction and the y direction.

In the image forming apparatus 100 of FIG. 1, a feeding cassette 10 is provided as an accommodation chamber that accommodates a large number of sheets S in a lower portion of an apparatus body 1A. As the sheets S serving as recording materials, various sheets of different sizes and materials can be used. Examples of the various sheets include paper sheets such as regular paper sheets and cardboards, plastic films, cloths, surface-treated sheet materials such as coated paper sheets, and sheet materials of irregular shapes such as envelops and index paper sheets. A pickup roller 15 serving as a feeding unit picks up a sheet S accommodated in the feeding cassette 10 and passes the sheet S onto a conveyance roller 16 and a separation roller 17. When a plurality of sheets S are fed from the pickup roller 15, the conveyance roller 16 and the separation roller 17 separate one sheet S from the plurality of sheets S and conveys the sheet S downstream in a conveyance direction of the sheet S along a conveyance path in the apparatus body 1A. A registration roller pair 4 corrects the skew of the sheet S, and conveys the sheet S toward a secondary transfer portion 6 along a first conveyance path 22a.

In parallel with the feeding of the sheet S from the feeding cassette 10, a toner image formation process is performed by an image forming portion 7 serving as an image forming unit. The image forming portion 7 is a tandem-type electrophotographic unit of an intermediate transfer system in which four image forming stations 7Y, 7M, 7C, and 7K are arranged along an intermediate transfer belt 9. The image forming stations 7Y, 7M, 7C, and 7K respectively form yellow, magenta, cyan, and black toner images on photosensitive drums 71 that are electrophotographic photoconductors serving as image bearing members, and transfer the toner images onto the intermediate transfer belt 9 through primary transfer. That is, the surface of each of the photosensitive drums 71 is uniformly charged by a charger such as a charging roller, and is then exposed to light radiated from an exposing unit 2, and thus an electrostatic latent image corresponding to a monochromatic image of the corresponding color is formed thereon. This electrostatic latent image is developed into and visualized as a monochromatic toner image with toner supplied from a developing unit, and is then transferred onto the intermediate transfer belt 9 by primary transfer rollers 72. Attached matter such as transfer residual toner remaining on the surface of the photosensitive drums 71 without being transferred onto the intermediate transfer belt 9 is removed by unillustrated drum cleaners.

The monochromatic toner images formed by the image forming stations 7Y to 7K are transferred onto the intermediate transfer belt 9 through primary transfer so as to be superimposed on one another, and thus a full-color toner image is formed on the intermediate transfer belt 9. The intermediate transfer belt 9 is stretched over a secondary transfer inner roller 91 and a stretching roller 92, and is rotationally driven in a counterclockwise direction in FIG. 1 to convey the toner image toward the secondary transfer portion 6.

The secondary transfer portion 6 is a nip portion between the intermediate transfer belt 9 and a secondary transfer roller 94. The inner peripheral surface of the intermediate transfer belt 9 is supported by the secondary transfer inner roller 91, and the secondary transfer roller 94 is disposed on the outer peripheral side of the intermediate transfer belt 9. The toner image born on the intermediate transfer belt 9 is transferred from the intermediate transfer belt 9 onto the sheet S through secondary transfer in the secondary transfer portion 6 by mechanical force and electrostatic bias applied by the secondary transfer roller 94 serving as a transfer unit.

The sheet S having passed through the secondary transfer portion 6 is conveyed to a fixing unit 12. The fixing unit 12 includes a rotary member pair constituted by rollers and/or belts, and a heat source that heats the toner image on the sheet S such as a halogen lamp, a ceramic heater, or an induction heating unit. The fixing unit 12 fixes the toner image to the sheet S by applying heat and pressure to the toner image on the sheet S while nipping and conveying the sheet S by a nip portion between the rotary member pair.

In the case of discharging the sheet S to the outside of the image forming apparatus 100 after image formation, the sheet S having passed through the fixing unit 12 is guided to a discharge roller pair 11 serving as a discharge unit by a switching flap 20 serving as a switching member. Then, the sheet S is discharged by the discharge roller pair 11 onto a discharge tray 13 provided in an upper portion of the apparatus body 1A.

In the case of forming images on both surfaces of the sheet S, the sheet S to a first surface of which an image has been transferred and fixed is guided toward a reverse conveyance roller pair 21 by the switching flap 20. The reverse conveyance roller pair 21 pulls in the sheet S from the first conveyance path 22a, and reverses the conveyance direction after the trailing end of the sheet S has passed the switching flap 20 to deliver out the sheet S toward a second conveyance path 22b. The second conveyance path 22b is a conveyance path for duplex image formation branching from the first conveyance path 22a on which the image forming portion 7 is provided. Then, the sheet S having been conveyed to the first conveyance path 22a again through the second conveyance path 22b is discharged onto the discharge tray 13 by the discharge roller pair 11 after an image is formed on a second surface opposite to the first surface by passing through the secondary transfer portion 6 and the fixing unit 12.

Here, on the second conveyance path 22b of the image forming apparatus 100 of the present embodiment, the reading unit 24, a white reference plate 32, a conveyance guide 33, and a plurality of conveyance roller pairs are provided. In the illustrated configuration example, three conveyance roller pairs 1, 3, and 5 are provided as the plurality of conveyance roller pairs. The conveyance roller pair 1 is disposed most upstream in the second conveyance path 22b in the conveyance direction of the sheet S in the second conveyance path 22b, and receives and conveys the sheet S reversed by the reverse conveyance roller pair 21. The conveyance roller pair 3 is disposed downstream of the conveyance roller pair 1 and upstream of the reading unit 24, and the conveyance roller pair 5 is disposed downstream of the reading unit 24. That is, the conveyance roller pairs 3 and 5 are each conveyance members that convey the sheet S through a reading position of the reading unit 24. The reading position is a position in the second conveyance path 22b where an optical image on the sheet S is read by the reading unit 24.

The reading unit 24 is disposed to oppose the white reference plate 32 serving as an opposing member with the second conveyance path 22b therebetween. The opposing member is also referred to as an opposing unit or a backing unit, and the reading unit 24 and the white reference plate 32 constitute a reading portion. That is, the reading unit 24 is disposed to oppose one surface of the sheet S passing through the second conveyance path 22b, and the white reference plate 32 is disposed to oppose the other surface of the sheet S passing through the second conveyance path 22b. To be noted, in the case of performing normal duplex image formation, the reading unit 24 opposes the first surface of the sheet S passing through the second conveyance path 22b, and the white reference plate 32 opposes the second surface of the sheet S. That is, the reading unit 24 opposes the surface of the sheet S on which an image is formed first in duplex image formation, and the white reference plate 32 opposes the surface of the sheet S on which an image is formed later in the duplex image formation.

The reading unit 24 functions as an image reader that obtains image data of the sheet S by optically scanning the sheet S passing through the second conveyance path 22b. The image data will be hereinafter referred to as a read image. The reading unit 24 is supported by the inner frame 18 constituting the frame body of the apparatus body 1A so as to be movable in such a direction as to move closer to and away from the white reference plate 32, that is, in the thickness direction of the sheet S and the depth-of-field direction of the optical system in the reading portion. By reading the white reference plate 32 by the reading unit 24, the controller of the image forming apparatus 100 can generate data for performing shading correction of the read image, that is, data for defining the reference white level.

Here, the casing of the image forming apparatus 100, that is, a portion excluding the reading unit 24, the white reference plate 32, and the like is constituted by the apparatus body 1A and a maintenance door 23 serving as an opening/closing member openable and closable with respect to the apparatus body 1A. The white reference plate 32 is supported by the maintenance door 23. When a user is notified by the image forming apparatus 100 that a jam of the sheet S has occurred, the user can open the maintenance door 23 and remove the sheet S from the second conveyance path 22b.

Incidentally, conveyance rollers and the like for conveying the sheet S are typically arranged at such intervals that the sheet can be passed onto one another, in accordance with the minimum length in the conveyance direction of various sheets on which image formation can be performed by the image forming apparatus 100. In the present embodiment, particularly the conveyance roller pair 3 upstream of the reading portion is disposed in a position close to the reading unit 24 in the sheet conveyance direction. As a result of this, the relative positions of the nip position of the conveyance roller pair 3 and the gap in the reading portion are stabilized, and thus the reading unit 24 can read an image from a surface of the sheet S stably delivered out by the conveyance roller pair 3 such that improvement in precision of the image read by the reading unit 24 can be expected.

To be noted, the conveyance roller pair 5 downstream of the reading portion is disposed at a position relatively farther from the reading unit 24 than the conveyance roller pair 3 disposed on the upstream side. This is mainly for optimizing the overall configuration of the image forming apparatus 100. However, the conveyance roller pair 5 disposed on the downstream side may be disposed at a position as close to the reading unit 24 as the conveyance roller pair 3 disposed on the upstream side for further improvement of the precision of the read image.

The conveyance roller pair 3 disposed upstream of the reading portion includes a conveyance roller 3a as a driving member that rotates by receiving a driving force input from a drive source, and a conveyance roller 3b as a driven member that rotates in accordance with the conveyance roller 3a. The conveyance roller 3a serves as a first roller of the present embodiment, and the conveyance roller 3b serves as a second roller of the present embodiment that constitutes a roller pair with the first roller. In the present embodiment, the conveyance roller 3a as the driving member is supported by the maintenance door 23, and the conveyance roller 3b as the driven member is supported by an inner frame 18 of the apparatus body 1A.

By disposing the conveyance roller 3a as the driving member on the maintenance door 23 and disposing the conveyance roller 3b as the driven member on the apparatus body 1A, the possibility of occurrence of damage to the image at the time of conveying the sheet S on the first surface of which an image has been formed in a duplex image forming operation to the conveyance roller pair 3 can be lowered. That is, whereas the conveyance roller 3a as the driving member is formed from a material such as rubber having high friction on the sheet S such that the sheet S can be more reliably conveyed, the conveyance roller 3b as the driven member is formed from a material such as plastics having relatively low friction on the sheet S. Therefore, in the case where the conveyance roller 3b as the driven member is disposed on the maintenance door 23 and the conveyance roller 3a as the driving member is disposed on the apparatus body 1A, there is a possibility that the conveyance roller 3a as the driving member strongly rubs the first surface of the sheet S to leave a scratch mark on the image on the first surface. In contrast, according to the layout of the present embodiment, the conveyance roller 3b as the driven member comes into contact with the first surface of the sheet S, and therefore the possibility of the scratch mark can be lowered. However, a configuration in which a conveyance roller as the driving member is supported by the inner frame 18 and a conveyance roller as the driven member is supported by the maintenance door 23 may be employed. The supporting configuration of the conveyance roller pair 3 upstream of the reading portion will be described in detail later.

2. Reading Unit

Figure 2:
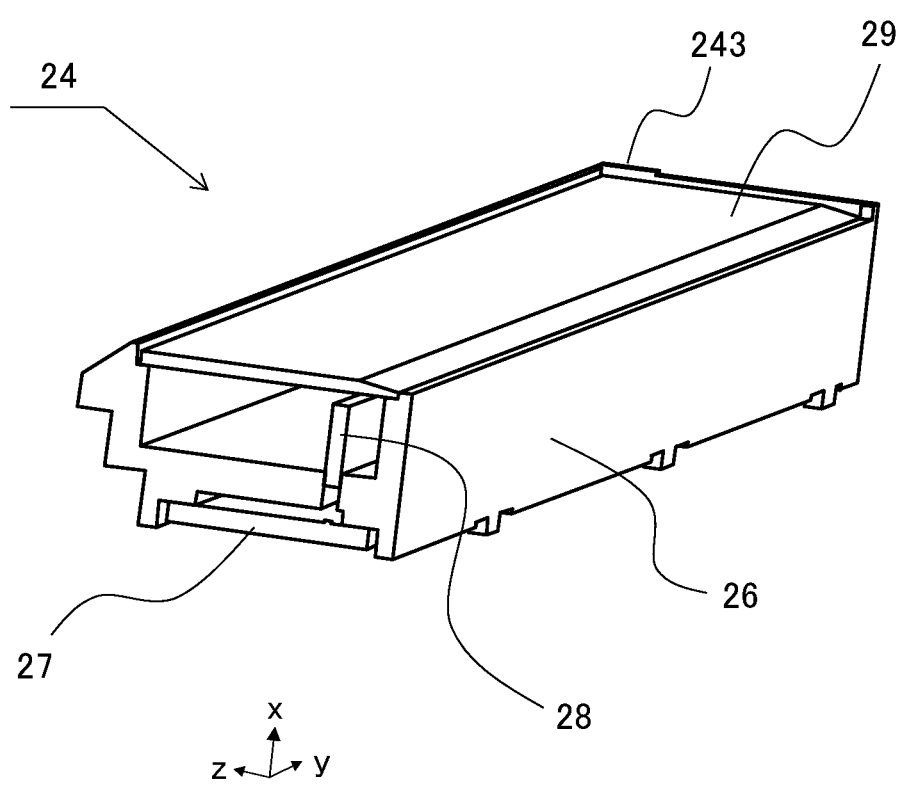
FIG. 2 is a perspective view of a reading unit according to the first embodiment illustrating a section thereof.

FIG. 2 is a perspective view of the reading unit 24 illustrating a section thereof. The reading unit 24 is a unit of a so-called contact image sensor: CIS, and includes a casing 26, an electric board 27, a rod lens array 28, contact glass 29, and so forth. The casing 26 has an elongated approximate rectangular parallelepiped shape extending in the y direction, the contact glass 29 is attached to the casing 26 from one side in the x direction, and the electric board 27 is attached to the casing 26 from the other side in the x direction. The contact glass 29 opposes the second conveyance path 22*b* and the white reference plate 32 (FIG. 1). The rod lens array 28 is disposed to oppose the electric board 27 in the x direction, and focuses reflection light from the sheet S on an imaging surface of an image sensor serving as a light receiving element or a photoelectric conversion element mounted on the electric board 27. To be noted, although a reading unit of a 1× magnification optical system including a rod lens array has been described as an example herein, for example, a reading unit of a charge-coupled device (CCD) that focuses the reflection light from the sheet on a charge-coupled device element through a reduction optical system including a plurality of mirrors may be used.

On the basis of results of reading the sheet S by the reading unit 24 received from the electric board 27, a central processing unit: CPU mounted on an unillustrated control board connected to the electric board 27 grasps the printing state of the image and executes malfunction diagnosis of the image forming apparatus 100. For example, the read image obtained by using the reading unit 24 is used for detecting occurrence of image defect early to notify that maintenance is required, and for correcting image formation conditions to maintain the image quality. Examples of the image formation conditions include settings of amount of exposure by the exposing unit 2, and settings of voltage values for charging, development, and transfer in an electrophotographic process. The sheet S subjected to a reading target may be a sheet on which an image has been formed to obtain a printed product, or a sheet on which a predetermined image pattern, that is, a test chart has been formed. The CPU described above functions as a control unit that controls the operation of the image forming apparatus 100.

Figure 3:
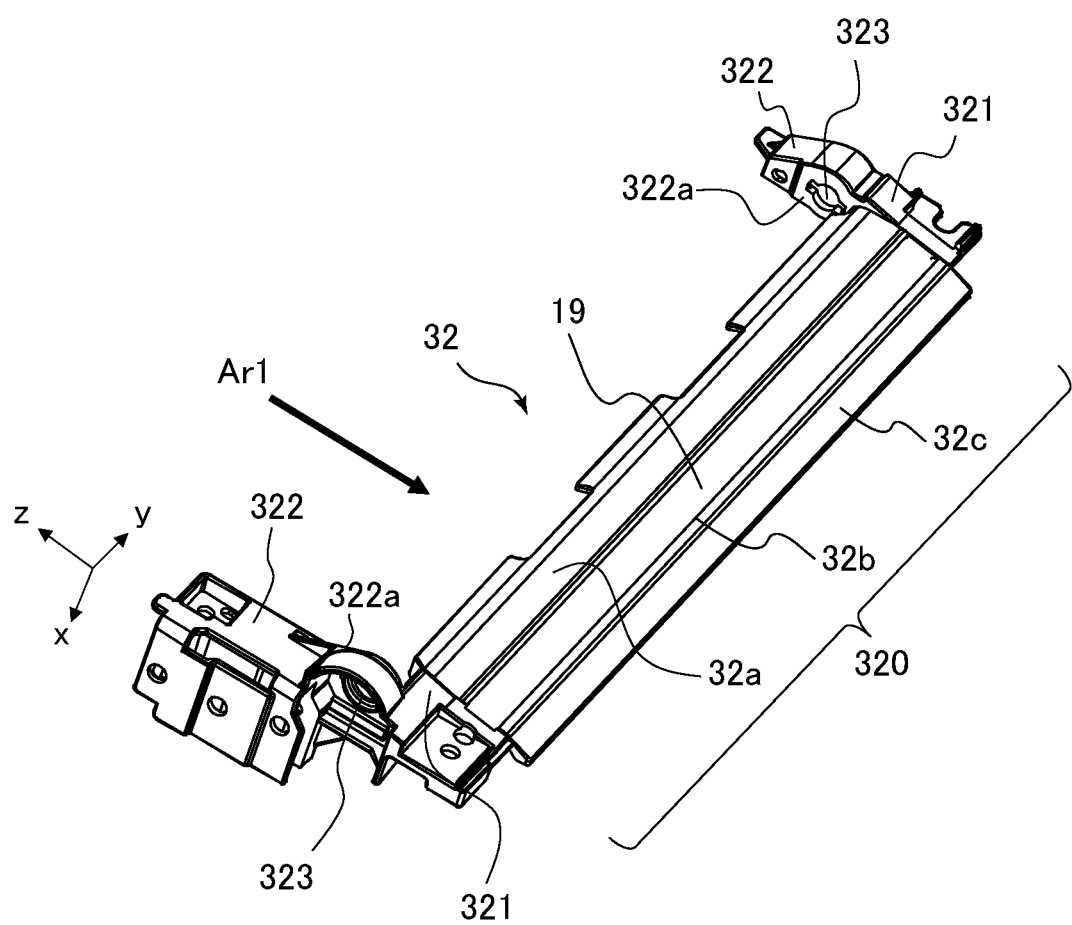
FIG. 3 is a perspective view of a white reference plate according to the first embodiment.

FIG. 3 is a perspective view of the white reference plate 32. In FIG. 3, an arrow Ar1 indicates a sheet conveyance direction in the reading portion. The white reference plate 32 is molded from resin, and has a guide shape for conveying a sheet. That is, the white reference plate 32 constitutes a sheet conveyance path in the reading portion together with the contact glass 29 of the reading unit 24. In other words, at a reading position of the reading unit 24 in the sheet conveyance direction indicated by the arrow Ar1, a conveyance space that is a part of the second conveyance path 22*b* is defined as a space or a gap between the white reference plate 32 and the contact glass 29.

The white reference plate 32 includes a body portion 320 serving as a guide portion extending in the y direction serving as the sheet width direction, and side portions 322 provided on the respective end portions of the body portion 320 in the y direction. The body portion 320 includes a surface on the sheet conveyance path side serving as a guide surface and opposing the contact glass 29. The body portion 320 includes a flat surface portion 32*b* having an approximate flat surface shape recessed away from the reading unit 24 as compared with the surroundings thereof, and a white sheet 19 that is a sheet-shaped member formed from resin is fixed to the flat surface portion 32*b* by, for example, adhesion by a double-sided tape. The white sheet 19 constitutes a white surface that defines the reference white level for reading the image by the reading unit 24. To be noted, the white reference plate 32 may be molded from a white resin material instead of sticking a resin sheet to a portion serving as a reference of color.

Further, the body portion 320 of the white reference plate 32 includes inclined portions 32*a* and 32*c* inclined with respect to the flat surface portion 32*b* and respectively provided on the upstream side and the downstream side of the flat surface portion 32*b*. The inclined portion 32*a* on the upstream side is inclined with respect to the surface of the contact glass 29 in such a manner that a more downstream portion thereof in the sheet conveyance direction is closer to the contact glass 29 in the x direction serving as the thickness direction of sheet in the reading portion and the field-of-depth direction of the reading unit 24 as viewed in the sheet width direction. The inclined portion 32*a* inclined in this manner has a function of guiding the leading end of the sheet conveyed from the second conveyance path 22*b* to the gap between the contact glass 29 and the white reference plate 32. The inclined portion 32*c* on the downstream side is inclined in such a manner that a more downstream portion thereof in the sheet conveyance direction is farther from the reading unit 24 in the x direction. The inclined portion 32*c* inclined in this manner guides the trailing end of the sheet having come out from the relatively narrow gap between the contact glass 29 and the white reference plate 32 to the downstream space that is wider, such that the trailing end of the sheet is smoothly passed onto a conveyance guide provided on the downstream side without leaping, that is, without suddenly moving in the thickness direction and colliding with the conveyance guide.

The guide surface of the body portion 320 of the white reference plate 32 on which the white sheet 19 is provided extends so as to cover the entirety of a passage region which the sheet passes through, in the sheet width direction perpendicular to the sheet conveyance direction indicated by the arrow Ar1. The passage region which the sheet passes through will be hereinafter referred to as a sheet passage region. The sheet passage region is a region in the sheet width direction in the reading portion corresponding to a range which the sheet passes through when a sheet of the maximum width on which the image forming apparatus can form an image is conveyed. Illustrated elements such as abutting portions 321, side portions 322, and bearing supporting portions 323 will be described later.

Figure 4:
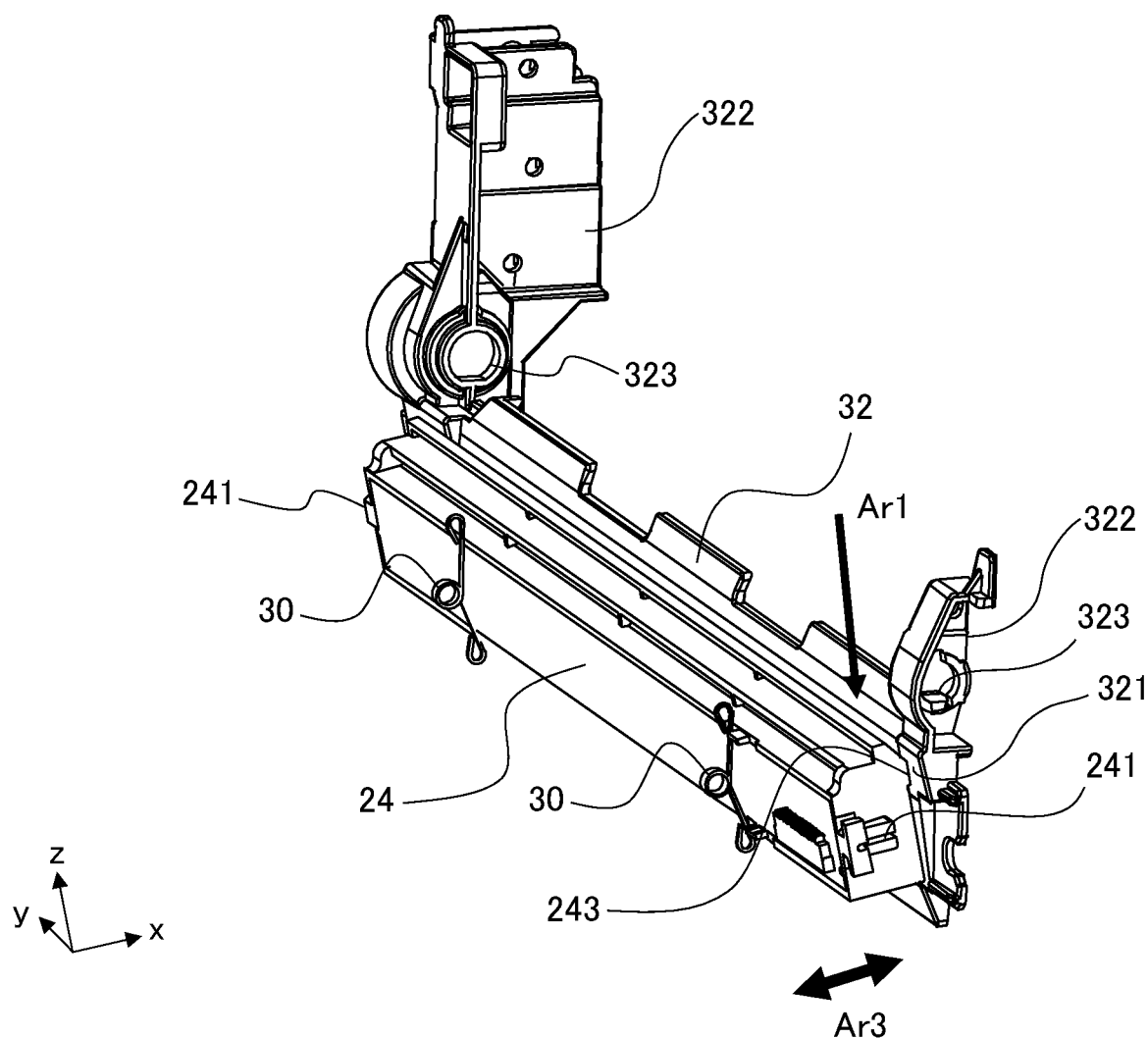
FIG. 4 is a perspective view of the reading unit and the white reference plate according to the first embodiment illustrating a positional relationship therebetween.

FIG. 4 is a perspective view for describing the positional relationship between the reading unit 24 and the white reference plate 32 in the state of being attached to the image forming apparatus 100, and illustrates the reading unit 24 and the white reference plate 32 opposing each other as viewed from the rear side of the reading unit 24. In FIG. 4, the arrow Ar1 indicates the sheet conveyance direction in the reading portion, and an arrow Ar3 indicates a direction in which the reading unit 24 is capable of moving.

Projection portions 241 are respectively provided on side walls 261 of the respective sides of the casing 26 of the reading unit 24 in the y direction. The projection portions 241 each engage with a recess portion 183 of the inner frame 18 that will be described later, and restricts the movement direction of the reading unit 24 with respect to the inner frame 18 to a predetermined direction indicated by the arrow Ar3.

In addition, the reading unit 24 includes abutting portions 243 provided on respective outer sides of the sheet passage region of the reading unit 24 in the y direction serving as the sheet width direction. To be noted, the sheet passage region is a range in the y direction in which there is a possibility that the sheet passes therethrough in normal conveyance operation in the case where sheets of various sizes that can be used in the image forming apparatus 100 are conveyed through the reading portion. The contact glass 29 is provided over the entirety of the sheet passage region in the y direction. In addition, the abutting portions 243 of the present embodiment are respectively provided on the side walls 261 of the respective sides of the casing 26 in the y direction.

Abutting portions 321 illustrated in FIG. 3 are provided on the white reference plate 32 so as to oppose the abutting portions 243 of the reading unit 24. The abutting portions 243 of the reading unit 24 project more toward the white reference plate 32 than the contact glass 29. Similarly, the abutting portions 321 of the white reference plate 32 project more than the white surface of the white reference plate 32. According to this configuration, a gap of a preset width is secured between the contact glass 29 and the white surface of the white reference plate 32 when the abutting portions 243 abut the abutting portions 321. The size of the gap is set in the range of, for example, 0.3 mm to 0.5 mm.

The sheet conveyed in the second conveyance path 22b is conveyed through this gap, therefore change in the sheet position in the depth-of-field direction is suppressed, and thus the reflection light from the sheet is more likely to be focused on the image sensor. To be noted, an appropriate gap can be also secured in the configuration in which either one of the abutting portions 243 of the reading unit 24 or the abutting portions 321 of the white reference plate 32 is omitted, by adjusting the amount of projection of the remaining abutting portions.

Figure 5:
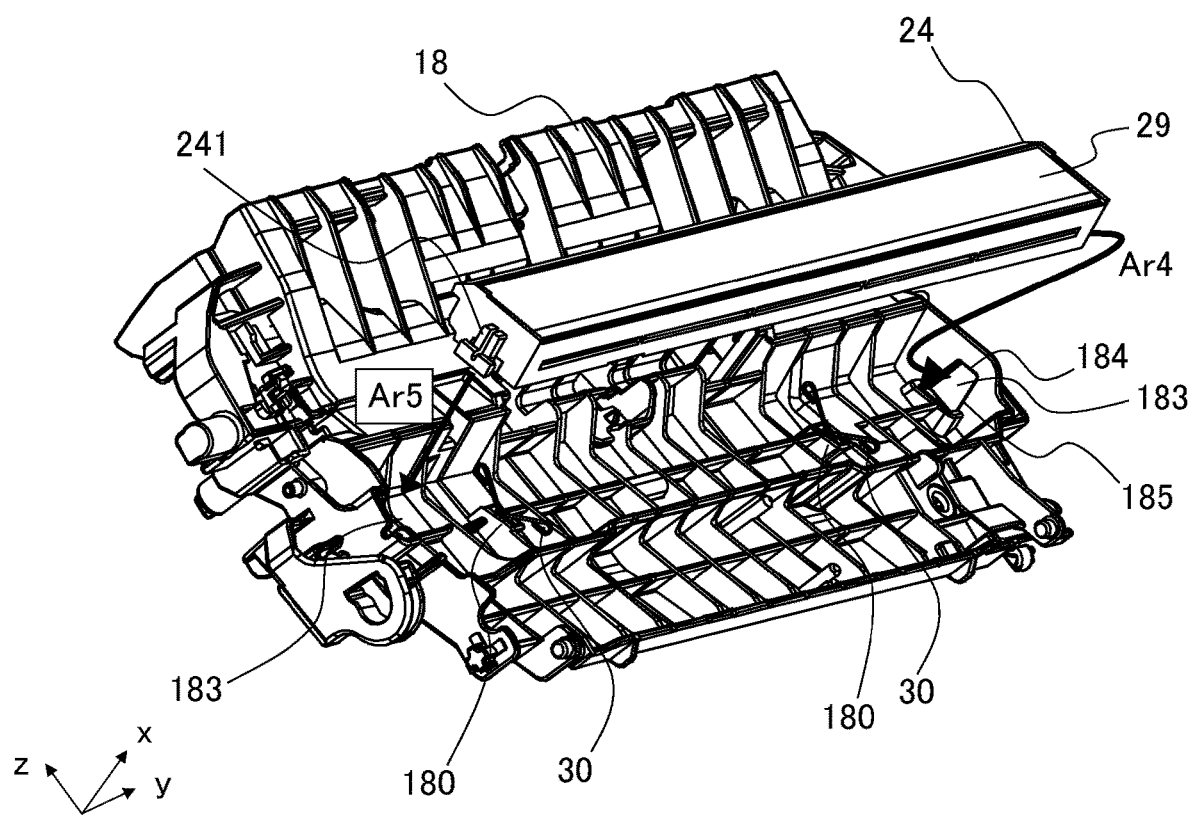
FIG. 5 is a perspective view for describing how the reading unit according to the first embodiment is attached.

FIG. 5 illustrates how the reading unit 24 is attached to the inner frame 18 of the apparatus body 1A. The reading unit 24 is attached to the inner frame 18 by engaging the projection portion 241 on one side wall and the projection portion 241 on the other side wall with the recess portions 183 provided on the inner frame 18 in the order of, for example, an arrow Ar4 and then an arrow Ar5. Here, the projection portions 241 are slidable with respect to side wall surfaces 185 of the recess portions 183. Therefore, the reading unit 24 is supported so as to be movable in a direction indicated by the arrow Ar3 of FIG. 4 to move closer to and away from the white reference plate 32 as described above.

As illustrated in FIG. 5, the inner frame 18 has two spring attaching holes 180. Torsion coil springs 30 are held by the inner frame 18 by fitting coil portions of the torsion coil springs 30 in the spring attaching holes 180. Two arm portions of each torsion coil spring 30 press the reading unit 24 toward the white reference plate 32 in a direction along the arrow Ar3 of FIG. 4. In a normal use condition of the image forming apparatus 100, the abutting portions 243 and 321 of the reading unit 24 and the white reference plate 32 abut each other by the urging force of the torsion coil springs 30, and thus the reading unit 24 is positioned in the arrow Ar3 direction.

In addition, a stopper for preventing the reading unit 24 from being pushed out by the urging force of the torsion coil springs 30 in the case where the white reference plate 32 is separated from the reading unit 24 by opening the maintenance door 23 can be provided on the inner frame 18. The stopper may be of any kind as long as the stopper abuts a part of the reading unit 24 and restricts the movement of the reading unit 24 in the arrow Ar3 direction. For example, a configuration in which a part 184 of a wall surface of a recess portion 183 comes into contact with a projection portion 241 to function as a stopper as illustrated in FIG. 5 may be employed. In addition, the stopper may be a separate member attached to the inner frame 18, a snap fit shape may be provided on the inner frame 18, or the stopper may come into contact with a projection portion 241 on a portion different from a recess portion 183.

As described above, by urging the reading unit 24 by an elastic member such as a spring, the reading unit 24 can follow the movement of the white reference plate 32 even if the position of the white reference plate 32 serving as an opposing member changes a little. As a result of this, an appropriate gap is maintained between the reading unit 24 and the white reference plate 32.

In addition, as a result of using the torsion coil springs 30 described above as elastic members, the reading unit 24 is urged in a good balance because the reading unit 24 is supported by two arm portions. Although the two torsion coil springs 30 are provided at a predetermined interval in the y direction serving as a sheet width direction of the sheet S in the first embodiment as illustrated in FIG. 5 in the first embodiment, compression springs or leaf springs may be used instead of torsion coil springs. In addition, the number of springs does not have to be 2. To be noted, the width direction of the sheet S is parallel to the longitudinal direction of the reading unit 24. Further, for example, a rubber member instead of a spring may be used as an elastic member that urges the reading unit 24.

While the reading unit 24 is reading an image on the sheet S that is being conveyed, the reading unit 24 may receive, for example, a force in a direction away from the white reference plate 32 due to the stiffness of the sheet. In addition, a tensile force may act on the sheet due to the conveyance speed difference between the conveyance roller pairs 3 and 5 upstream and downstream of the reading portion and the reading unit 24 may be pressed by the sheet. According to the present embodiment, the position of the reading unit 24 can be changed in accordance with the sheet, and therefore a focused state can be stably maintained. In addition, a strong rub of the reading unit 24 by the sheet is suppressed because the reading unit 24 follows the sheet, which is also advantageous in view of suppressing the wear of the contact glass 29 and the like caused by the rub.

3. White Reference Unit

A white reference unit 200 according to the present embodiment will be described in detail with reference to FIGS. 3, 4, 6, and 7. The white reference unit 200 described herein is a unit constituted by the white reference plate 32, the conveyance roller 3a upstream of the reading portion, and gears and the like for driving the conveyance roller 3a such that these members can be collectively attached to and detached from the image forming apparatus.

As illustrated in FIG. 3, the white reference plate 32 includes the side portions 322 provided on respective outer sides of the sheet passage region in the sheet width direction perpendicular to the sheet conveyance direction indicated by the arrow Ar1, that is, provided at respective end portions of the body portion 320, and extending in a direction intersecting with the sheet width direction, particularly along the sheet conveyance. The side portions 322 each include a wall surface portion 322a intersecting, preferably at an approximately right angle, with the rotation axis of the conveyance roller 3a extending in the sheet width direction. The wall surface portions 322a are each provided with a bearing supporting portion 323 for rotatably supporting the roller shaft of the conveyance roller 3a. The bearing supporting portions 323 are each a hole penetrating through a wall surface portion 322a in the sheet width direction.

Figure 6:
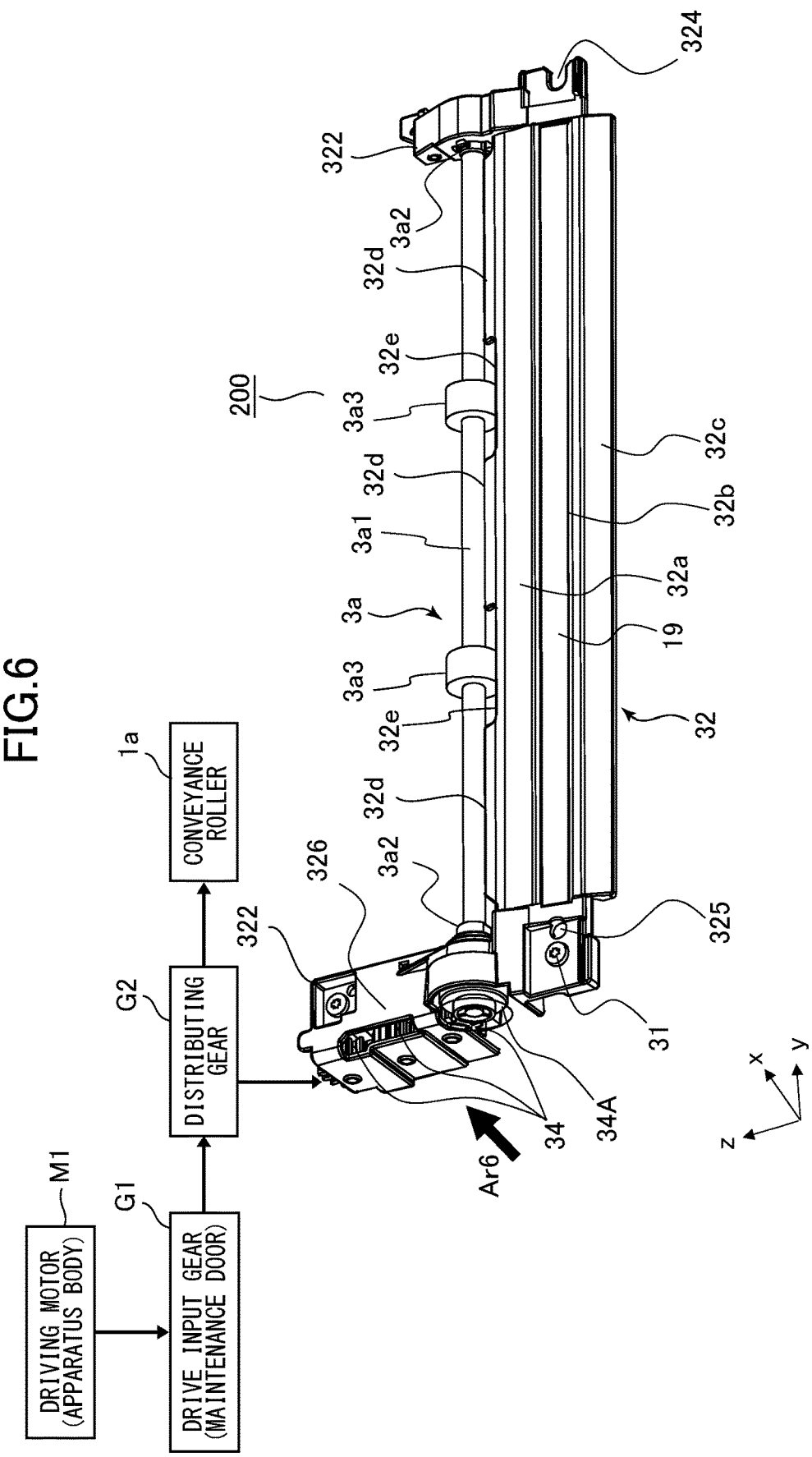
FIG. 6 is a perspective view of a white reference unit according to the first embodiment.

As illustrated in FIG. 6, the conveyance roller 3a includes a roller shaft 3a1 extending in the sheet width direction, that is, the rotation axis direction of the conveyance roller 3a, two roller bodies 3a3 provided on the outer circumferential surface of the roller shaft 3a1 to come into contact with the sheet, and bearings 3a2 provided on respective end portions thereof in the sheet width direction. The conveyance roller 3*a* is rotatably supported by the white reference plate 32, which constitutes the reading portion, by fitting the bearings 3*a*2 attached to the roller shaft 3*a*1 into the bearing supporting portions 323.

Figure 8:
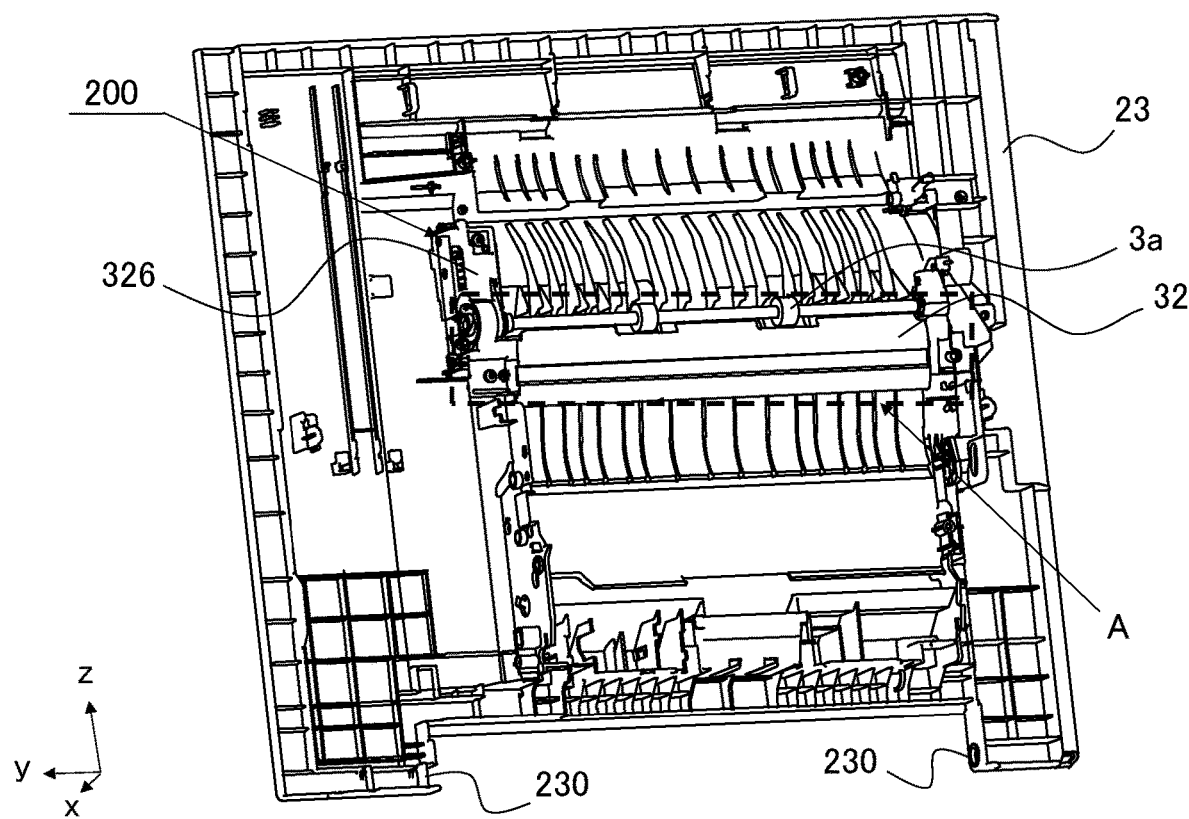
FIG. 8 is a perspective view of the white reference unit according to the first embodiment illustrating an attachment state thereof.

As illustrated in FIGS. 6 and 8, whereas the roller shaft 3*a*1 is positioned upstream of the guide surface of the body portion 320 serving as a guide portion of the white reference plate 32 in the sheet conveyance direction, part of each of the roller bodies 3*a*3 are accommodated in recess portions 32*e* that are notch shapes provided in the white reference plate 32. That is, the roller bodies 3*a*3 are respectively positioned within the recess portions 32*e* in the sheet width direction, that is, the rotation axis direction of the conveyance roller 3*a*. In addition, as viewed in the sheet width direction, part of the roller bodies 3*a*3 overlap with part of the guide surface, particularly the upstream end of the guide surface in the sheet conveyance direction.

As described above, an arrangement in which the recess portions 32*e* are provided in the white reference plate 32 such that part of the roller bodies 3*a*3 overlap with the upstream end 32*d* of the guide surface of the body portion 320 in terms of positions in the sheet conveyance direction is employed. As a result of this, the conveyance roller 3*a* can be disposed at a position closer to the reading position of the reading unit 24 than, for example, in a configuration in which the recess portions 32*e* are not provided and the upstream end 32*d* is a straight line. By shortening the distance from the position where the conveyance roller 3*a* comes into contact with the sheet, that is, the nip position of the conveyance roller pair 3 to the reading position, the position of the sheet in the reading position is more stabilized, and thus the precision of the read image can be improved.

To be noted, the width of the recess portions 32*e* in the sheet width direction, that is, the rotation axis direction of the conveyance roller 3*a*, is set to be larger than the width of the roller bodies 3*a*3 in the sheet width direction. This enables attaching the conveyance roller 3*a* to the bearing supporting portions 323 while reciprocating the conveyance roller 3*a* in the sheet width direction. That is, one of the bearings 3*a*2 is inserted in one of the bearing supporting portions 323 by moving the conveyance roller 3*a* toward one side in the sheet width direction in a state in which the conveyance roller 3*a* is not attached to the white reference plate 32. Then, the conveyance roller 3*a* is moved toward the other side in the sheet width direction to insert the other bearing 3*a*2 in the other bearing supporting portion 323, and thus both ends of the conveyance roller 3*a* are supported by the bearing supporting portions 323 of the white reference plate 32.

By causing the white reference plate 32 to support the conveyance roller 3*a* for conveying the sheet toward the reading portion, the position precision of the conveyance roller 3*a* and the white reference plate 32 is improved as compared with the case where the conveyance roller 3*a* is supported by the maintenance door 23 separately from the white reference plate 32. That is, the positional relationship between the nip in which the conveyance roller pair 3 nips and conveys the sheet S and the gap between the contact glass 29 and the white reference plate 32 in the reading portion is determined with high precision, and therefore the sheet delivered out from the nip smoothly passes through the gap.

In addition, in the present embodiment, the gap in the reading portion is secured by fixing the white reference plate 32 to the maintenance door 23 and urging the reading unit 24 toward the white reference plate 32 by the torsion coil springs 30. In this case, the positional relationship between the nip of the conveyance roller pair 3 and the gap in the reading portion can be determined with higher precision by integrating the conveyance roller 3*a* with the white reference plate 32 as a single unit.

As illustrated in FIG. 6, the white reference plate 32 further supports a plurality of gears 34 and a gear 34*a* for transmitting a driving force to the conveyance roller 3*a*. The plurality of gears 34 and 34A are configured such that, in a state in which the maintenance door 23 is closed, one of the plurality of gears 34 and 34A engages with a distributing gear G2 that rotates by a driving force from a driving motor M1 provided in the apparatus body 1A, and thus the drive can be transmitted to the conveyance roller 3*a*. The distributing gear G2 is a gear that is provided between a drive input gear G1, which is provided in the maintenance door 23 and through which the driving force from the driving motor M1 is input, and a conveyance roller 1*a* of the conveyance roller pair 1 illustrated in FIG. 1 and provided upstream of the conveyance roller 3*a* supported by the white reference plate 32, and rotates together with the conveyance roller 1*a*. In other words, the conveyance roller 3*a* supported by the white reference plate 32 is driven by a single drive source shared with the other conveyance roller 1*a* provided upstream by receiving part of the driving force of the driving motor M1 through the distributing gear G2 serving as a distributing portion. That is, a configuration in which the white reference plate 32 supports and is unitized with the conveyance roller 3*a*, and the gears 34 and 34A serving as a drive transmission mechanism for driving the conveyance roller 3*a* are incorporated in the unit such that a driving force can be supplied from an external drive source. Therefore, the image forming apparatus 100 having the reading function in the second conveyance path 22*b* can be provided, for example, with a simple configuration in which the reading unit 24 and the white reference plate 32 are provided, by repurposing a configuration of an image forming apparatus not having a reading function in the second conveyance path 22*b*.

The plurality of gears 34 and 34A include the gear 34A having a one-way clutch mechanism. In the illustrated example, the gear 34A attached to the roller shaft 3*a*1 of the conveyance roller 3*a* is provided with a one-way clutch mechanism. The one-way clutch mechanism relieves the conveyance speed difference, that is, peripheral speed difference between the upstream conveyance roller 1*a* and the conveyance roller 3*a*. In the case where the conveyance speed of the conveyance roller 3*a* is lower than the conveyance speed of the upstream conveyance roller 1*a* for some reason, the conveyance roller 3*a* idles due to blocking of coupling between the distributing gear G2 and the conveyance roller 3*a* by the one-way clutch mechanism, and thus a jam of the sheet between the upstream conveyance roller 1*a* and the conveyance roller 3*a* can be suppressed. In addition, for example, in the case where the driving motor M1 is stopped after the trailing end of the sheet has passed the upstream conveyance roller 1*a* and before the trailing end of the sheet passes the conveyance roller 3*a*, the conveyance roller 3*a* idles to let the conveyance roller pair 5 on the downstream side illustrated in FIG. 1 pull out the sheet to continue the conveyance.

To be noted, adding support elements such as gear shafts for supporting the gears 34 to the maintenance door 23 instead of employing the configuration in which the white reference plate 32 supports the gears 34 can be also considered. Meanwhile, according to the present embodiment, since the gears 34 are supported by support elements provided on the white reference plate 32, the drive train to the conveyance roller 3a can be supported by the same component, and thus the precision of engagement between the gears 34 can be improved.

Figure 7:
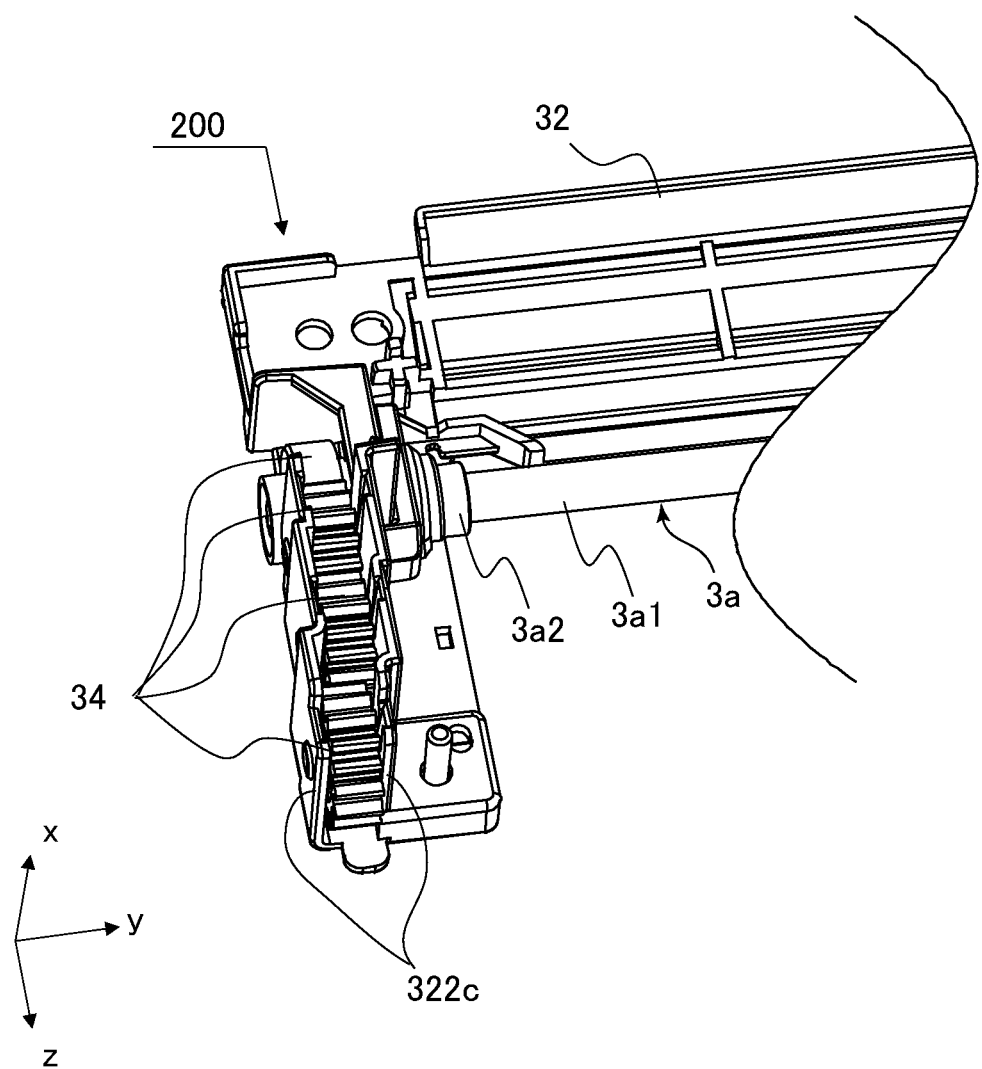
FIG. 7 is a perspective view of gears according to the first embodiment illustrating an attachment state thereof.

In addition, in the present embodiment, the shape of the white reference plate 32 is determined such that the plurality of gears 34 can be attached to the white reference plate 32 from the opposite side to the surface of the white reference plate 32 facing the sheet conveyance path, that is, from the opposite side to the guide surface, as indicated by an arrow Ar6. Specifically, as illustrated in FIG. 7, the wall surface portion 322a of a side portion 322 of the white reference plate 32 is provided with a gear attachment portion 322c having an angular C shape opening toward the opposite side to the sheet conveyance path, that is, in the +x direction. An operator can attach the respective gears 34 to predetermined positions of the gear attachment portion 322c by inserting the gears 34 in the −x direction while slightly pushing open the gear attachment portion 322c in the y direction that is the rotation axis direction of the gears 34.

The white reference unit 200 including the white reference plate 32 is attached to the maintenance door 23 as illustrated in FIG. 8. The maintenance door 23 is openable and closable with respect to the apparatus body 1A with hinges 230 as fulcrums. A user or a maintenance operator can open the maintenance door 23 to access and clean the white reference plate 32 and the contact glass 29. In addition, the user or the maintenance operator can open the maintenance door 23 to open the second conveyance path 22b and perform a jam removing operation of removing a jammed sheet remaining in the second conveyance path 22b.

To be noted, in a state in which the white reference unit 200 is attached to the maintenance door 23, a wall surface 326 of the white reference plate 32 illustrated in FIGS. 6 and 8 functions as a covering portion that covers the gears 34 and 34A. The wall surface 326 is exposed to a space between the maintenance door 23 and the apparatus body 1A in a state in which the maintenance door 23 is open, and covers at least part of the gears 34 and 34A as viewed from the apparatus body 1A side, that is, as viewed from the reading unit 24 side in the x direction. Therefore, the possibility of the user touching the gears 34 and 34A in the open state of the maintenance door 23 and erroneously detaching the gears 34 and 34A is lowered, and the safety is further improved. Further, also in the case where grease is applied on the gears 34 and 34A, the user touching the grease or the grease scattering to the guide surface of the white reference plate 32 can be suppressed without providing an additional component.

Figure 9:
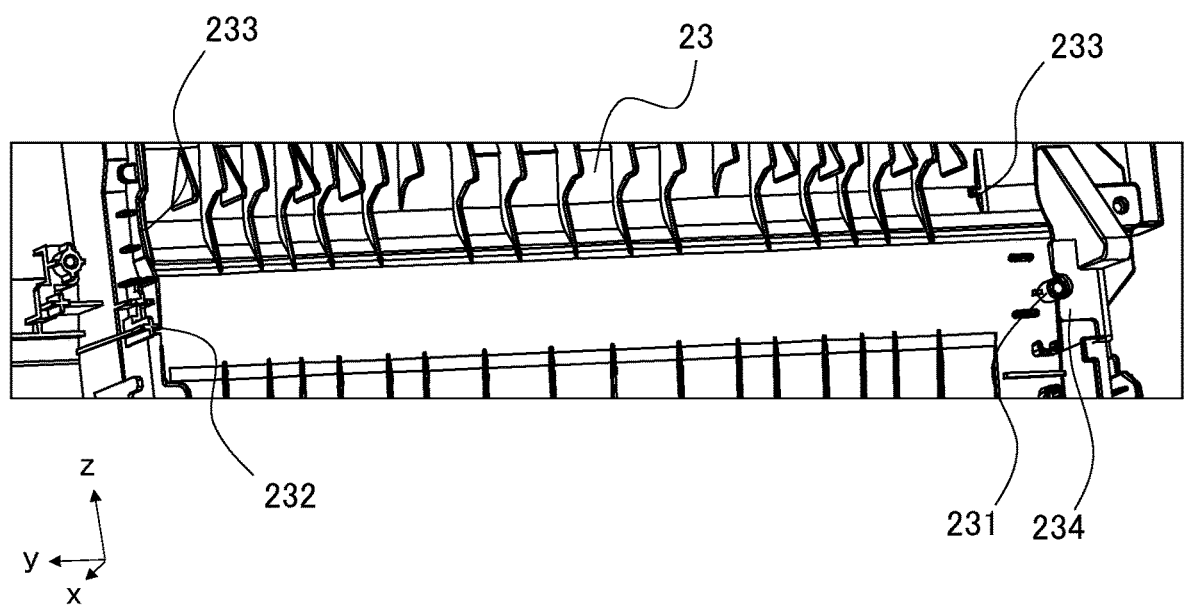
FIG. 9 is a perspective view for describing a positioning portion of the white reference unit according to the first embodiment.

The method of attaching the white reference unit 200 to the maintenance door 23 will be described with reference to FIGS. 6 and 9. FIG. 9 is an enlarged view of a part of the maintenance door 23 to which the white reference unit 200 is not attached, that is, a region A of FIG. 8. As illustrated in FIG. 6, an insertion portion 324 that is a U-shaped groove is provided on one outer side of the sheet passage region of the white reference plate 32 in the sheet width direction, that is, the y direction, and a positioning hole 325 is provided on the other outer side of the sheet passage region. In addition, a screw hole for attaching a screw 31 is defined in the vicinity of the positioning hole 325. As illustrated in FIG. 9, the maintenance door 23 is provided with a positioning boss 231 that engages with the insertion portion 324, a pressing portion 234, a positioning boss 232 that engages with the positioning hole 325, and an unillustrated female screw in which the screw 31 is fit in.

In the case of attaching the white reference unit 200, the position of the white reference unit 200 in the sheet conveyance direction is determined by aligning and inserting the positioning boss 231 illustrated in FIG. 9 with and in the insertion portion 324 of the white reference plate 32. At this time, the position of the white reference unit 200 in the x direction, that is, the thickness direction of the sheet in the reading portion and the depth-of-field direction of the reading unit 24, is restricted by the pressing portion 234 having an eave shape, and therefore no fixation with a screw or the like is needed. Subsequently, the positioning boss 232 is fitted in the positioning hole 325 of the white reference plate 32, the screw 31 is tightened, and thus the white reference unit 200 is fixed to the maintenance door 23. Since the position of the white reference unit 200 is fixed at both end portions of the white reference plate 32 in the sheet width direction in this manner, the precision of the position of the white reference plate 32 such as how the white reference plate 32 is perpendicular to the sheet conveyance direction or the angle of the guide surface as viewed in the sheet width direction can be improved.

Here, the conveyance roller 3a is configured to abut the conveyance roller 3b on the apparatus body side illustrated in FIG. 1 by a pressurizing force of an appropriate magnitude for nipping and conveying the sheet in a state in which the maintenance door 23 is closed. Therefore, as illustrated in FIG. 9, the maintenance door 23 includes two projection portions 233 for receiving the pressurizing force that the conveyance roller 3a receives. For example, the projection portions 233 are disposed so as to abut the wall surface portions 322a of the respective sides of the white reference plate 32 illustrated in FIG. 3 at the position of the rotation axis of the conveyance roller 3a with respect to the sheet conveyance direction. As a result of disposing the projection portions 233 serving as pressure receiving portions that receive the pressurizing force of the conveyance roller pair 3 at the respective end portions in the sheet width direction, the white reference plate 32 no longer receives all of the pressurizing force, thus the white reference plate 32 becomes less likely to be warped, and the position precision of the white reference plate 32 and the conveyance roller 3a can be improved.

Modification Example

Figure 14:
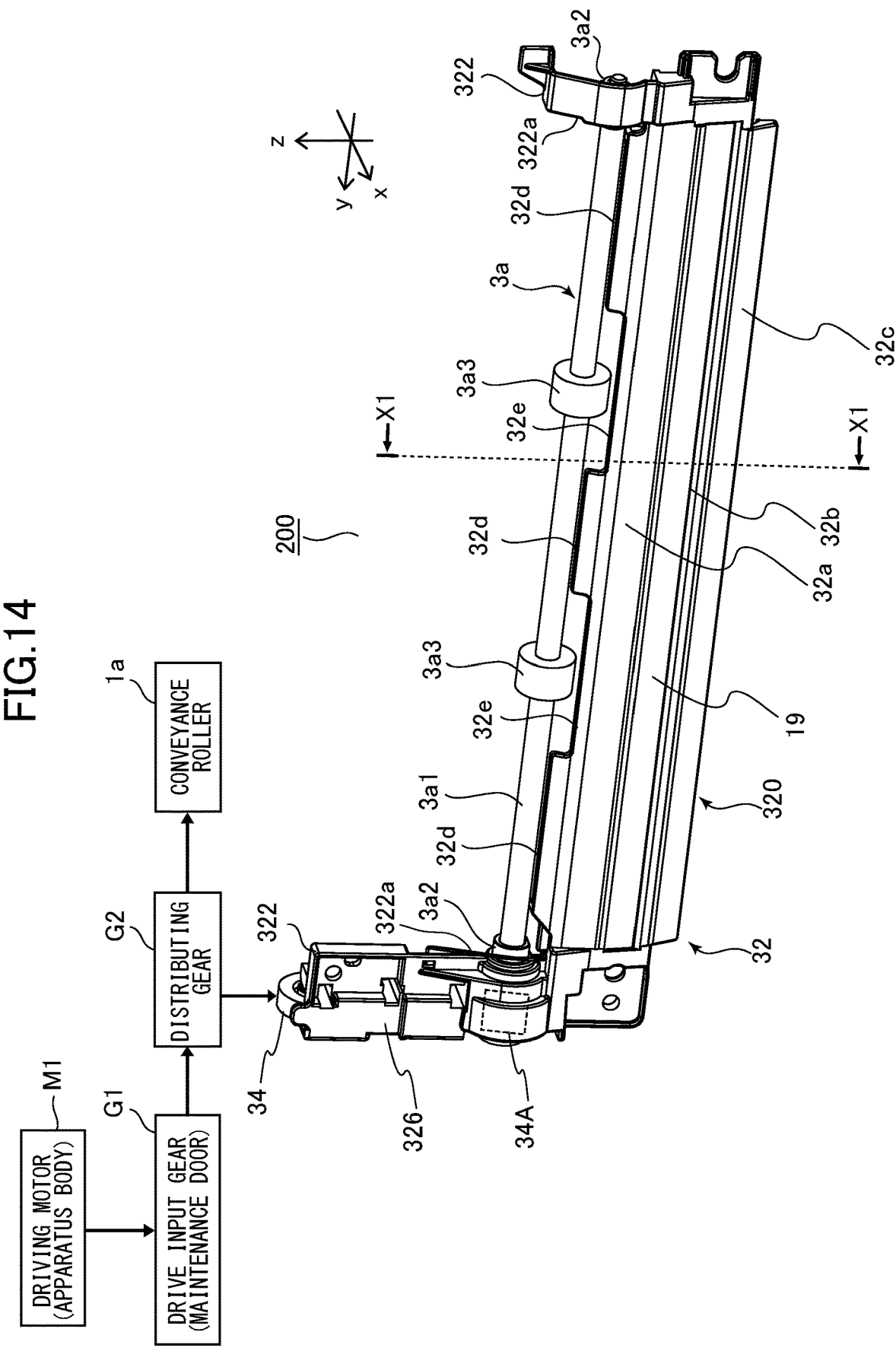
FIG. 14 is a perspective view of a white reference unit according to a modification example of the first embodiment.
Figure 15:
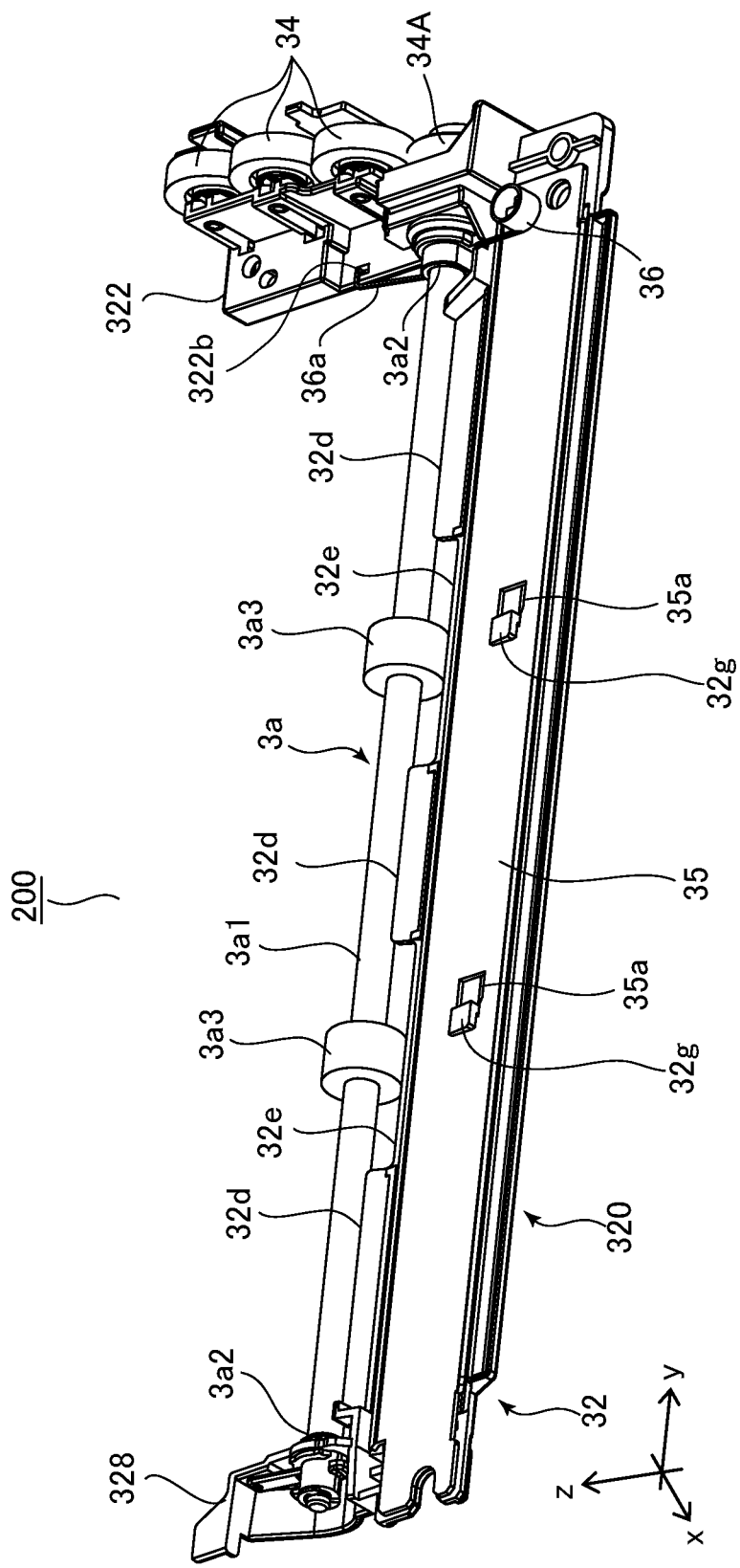
FIG. 15 is a perspective view of the white reference unit according to the modification example of the first embodiment.
Figure 16:
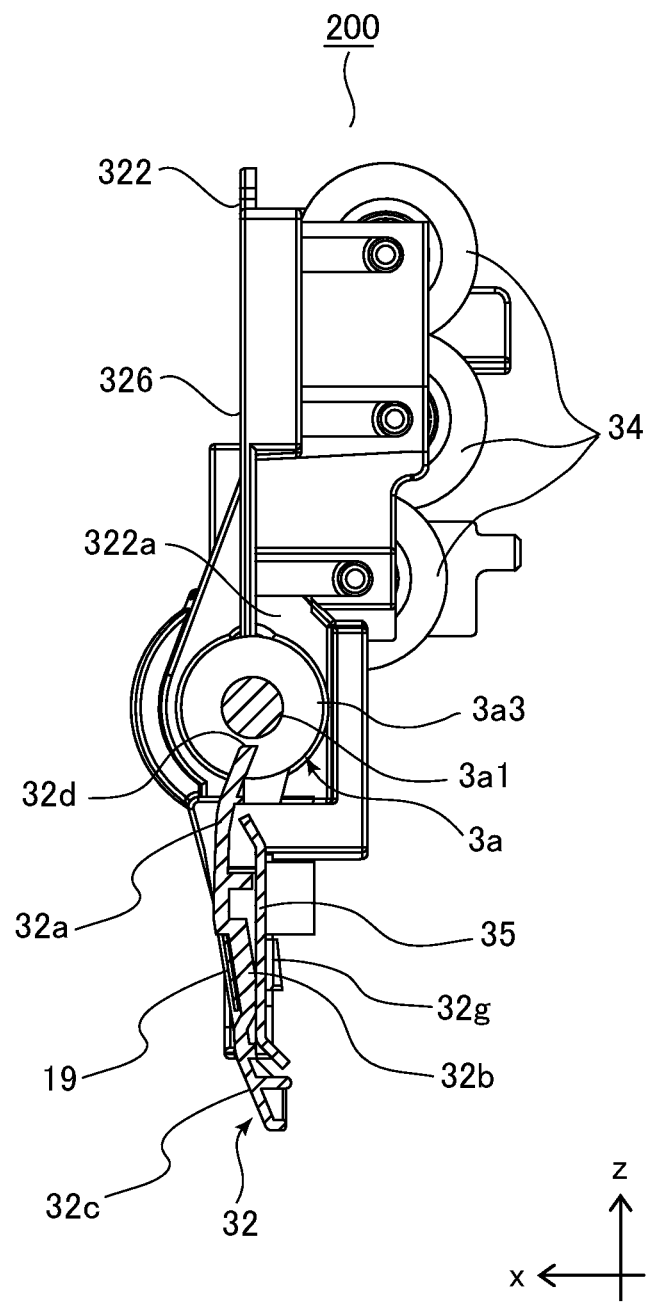
FIG. 16 is a section view of the white reference unit according to the modification example of the first embodiment.

The white reference unit 200 according to a modification example of the first embodiment will be described with reference to FIGS. 14 to 16. FIG. 14 is a perspective view of the white reference unit 200 according to the present modification example as viewed from the reading unit 24 side in the x direction. FIG. 15 is a perspective view of the white reference unit 200 according to the present modification example as viewed from an opposite side to the reading unit 24 in the x direction. FIG. 16 illustrates a section of the white reference unit 200 perpendicular to the x direction at the position of a line X1-X1 of FIG. 14. In the description below, it is assumed that elements denoted by the same reference signs as in the first embodiment have substantially the same configuration and effect as in the first embodiment, and parts different from the first embodiment will be mainly described.

As illustrated in FIG. 14, similarly to the first embodiment, the white reference unit 200 of the present modification example includes the white reference plate 32 to which the white sheet 19 is attached, the conveyance roller 3a rotatably supported by the side portions 322 of the white reference plate 32, and the gears 34 and 34A for transmitting the driving force to the conveyance roller 3*a*. The wall surface 326 serving as a cover portion that covers at least part of the gears 34 and 34A as viewed from the reading unit 24 side in the x direction is also provided on one of the side portions 322 although the shape thereof is different from that of the first embodiment. In addition, the roller bodies 3*a*3 of the conveyance roller 3*a* are positioned within the recess portions 32*e* provided in the white reference plate 32 in the sheet width direction, that is, the rotation axis direction of the conveyance roller 3*a*, and as illustrated in FIG. 16, part of the white reference plate 32, that is, the upstream end 32*d* overlaps with the roller bodies 3*a*3 as viewed in the sheet width direction.

As illustrated in FIG. 15, a metal plate 35 serving as a reinforcing member is attached to the back side, that is, the side opposite to the reading unit 24 in the x direction, of the body portion 320 of the white reference plate 32. The metal plate 35 extends in the sheet width direction to cover at least the entirety of the sheet passage region. The metal plate 35 is provided with an engagement hole 35*a*, and the metal plate 35 and the white reference plate 32 are fixed together in the state of abutting each other in the x direction as illustrated in FIG. 16, by engaging a claw portion 32*g* of the white reference plate 32 with the engagement hole 35*a*. By using the white reference plate 32 formed from resin that is flexible in terms of the shape thereof, and supporting the back side of the white sheet 19 by the metal plate 35 having high strength and high stiffness, warpage of the white sheet 19 can be suppressed to improve the reading precision of the reading unit 24.

In addition, as illustrated in FIG. 15, a coil spring 36 is disposed such that one end surface thereof is in contact with the metal plate 35. An arm portion 36*a* of the coil spring 36 is hooked on a hole 322*b* provided in a side portion 322 of the white reference plate 32 while in contact with one of the bearings 3*a*2 of the conveyance roller 3*a*. In addition, the coil spring 36 is electrically grounded by being in contact with an unillustrated conductive member such as a metal wire connected to a metal frame of the apparatus body 1A. Therefore, the conveyance roller 3*a* and the metal plate 35 are both electrically grounded via the coil spring 36 serving as a grounding member. In this manner, a conveyance failure of sheet, electrical discharge, or the like caused by electrification of the conveyance roller 3*a* or the metal plate 35 can be suppressed by a simple configuration using a common grounding member. The contact between the conveyance roller 3*a* and the metal plate 35 can be more reliably maintained by using an elastic member such as the coil spring 36 or a metal leaf spring as the grounding member.

As described above, by unitizing the white reference plate 32, the conveyance roller 3*a*, the gears 34, and so forth, for example, in the case where the conveyance roller 3*a* upstream of the reading portion requires to be replaced due to wear, the replacement can be performed easily. In addition, as a result of such unitization, the specifications of the image forming apparatus 100 can be changed between a model having an image reading function and a model not having an image reading function. That is, the model not having the image reading function can be prepared by removing the reading unit 24 and the white reference unit 200 from the image forming apparatus 100 of the present embodiment and adding an appropriate guide shape to the apparatus body 1A and the maintenance door 23 as necessary. In addition, it is also easy to set the model not having an image reading function as a standard model and treating the image reading function as an attachable option.

Second Embodiment

Next, a second embodiment will be described. The second embodiment is different from the first embodiment in that the reading unit is fixed and the white reference unit is urged toward the reading unit. In the description below, it is assumed that elements denoted by the same reference signs as in the first embodiment have substantially the same configuration and effect as in the first embodiment, and parts different from the first embodiment will be mainly described.

Figure 10:
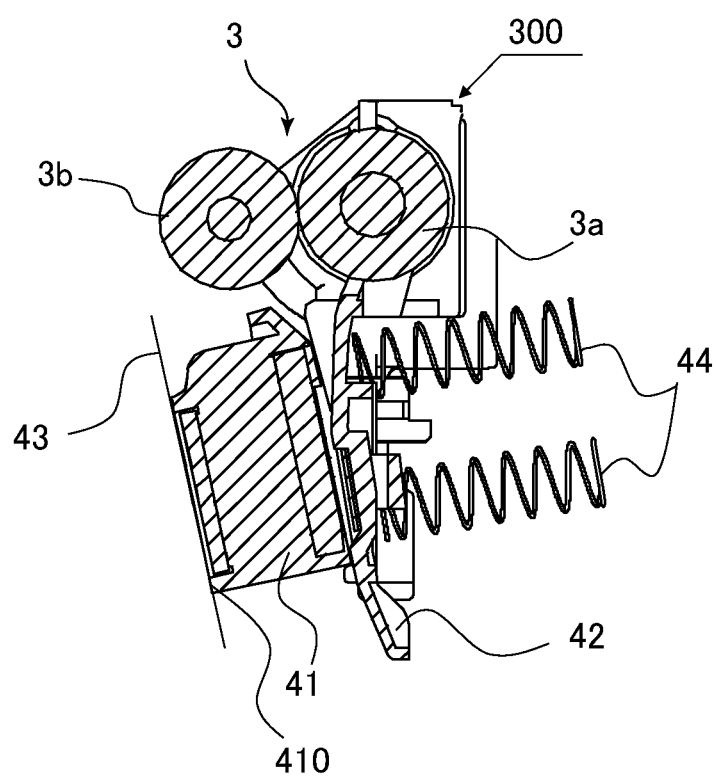
FIG. 10 is a section view of a reading unit and a white reference unit according to a second embodiment.

FIG. 10 is a section view of the reading portion and the vicinity thereof of the image forming apparatus according to the present embodiment as viewed in the sheet width direction, that is, the y direction. Although a reading unit 41 is supported by an inner frame 43 of the apparatus body 1A similarly to the first embodiment, the reading unit 41 is configured to be fixed by a bottom surface 410 thereof abutting the inner frame 43 instead of being pressurized by an elastic member in the present embodiment. To be noted, the abutting portion of the reading unit 41 may be a portion different from the bottom surface 410 such as a protrusion for abutment.

Meanwhile, a white reference unit 300 is supported by the maintenance door 23 to be movable in a direction to move closer to and away from the reading unit 41, and is pressurized toward the reading unit 41 by spring members 44. Similarly to the first embodiment, the white reference unit 300 has a configuration in which at least a white reference plate 42 and the conveyance roller 3*a* upstream of the reading portion are integrated as a unit. In addition, also similarly to the first embodiment, portions where the reading unit 41 and the white reference plate 42 come into contact with each other have projection shapes like the abutting portions 243 and 321 illustrated in FIG. 4.

Also according to the configuration of the present embodiment, the precision of the positional relationship between the white reference plate 42 and the conveyance roller 3*a* upstream of the reading portion can be improved similarly to the first embodiment, therefore the sheet can be stably conveyed to the reading portion, and the reading precision can be improved. The other effects of unitization of the white reference plate are similar to that of the first embodiment.

In addition, according to the present embodiment, since the position of the reading unit 41 with respect to the inner frame 43 of the apparatus body 1A is fixed, the positioning precision of the reading portion with respect to the apparatus body 1A can be improved. In addition, the reading unit 41, which is a precision part, is coupled to the inner frame 43 by rigid connection. Therefore, the risk of damage and droppage of the reading unit 41 by strong impact or vibration applied during transportation and operation can be lowered, and moreover, the influence of vibration of the reading unit 41 during reading on the precision of the read image can be reduced.

Third Embodiment

Next, a third embodiment will be described. The third embodiment is different from the first embodiment in that the conveyance roller is supported by the maintenance door and the white reference unit is supported by the maintenance door in the state of being fitted with the bearings of the conveyance roller. In the description below, it is assumed that elements denoted by the same reference signs as in the first embodiment have substantially the same configuration and effect as in the first embodiment, and parts different from the first embodiment will be mainly described.

Figure 11:
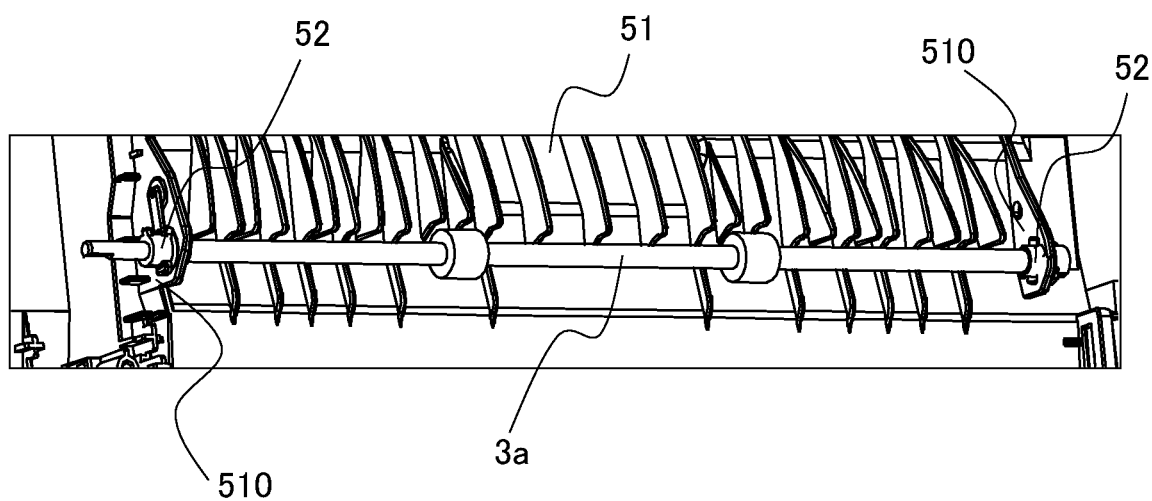
FIG. 11 is a perspective view for describing a supporting configuration of a conveyance roller according to a third embodiment.

FIG. 11 illustrates part of a maintenance door 51 after the conveyance roller 3a is attached thereto and before a white reference plate is attached thereto. The maintenance door 51 includes a pair of wall surfaces 510 provided on respective outer sides of the sheet passage region in the sheet width direction. Bearings 52 that rotatably support the roller shaft 3a1 of the conveyance roller 3a upstream of the reading portion are fitted in the wall surfaces 510. That is, the maintenance door 51 rotatably supports the roller shaft 3a1 that is a shaft portion of the conveyance roller 3a via the wall surfaces 510 and the bearings 52.

Figure 12:
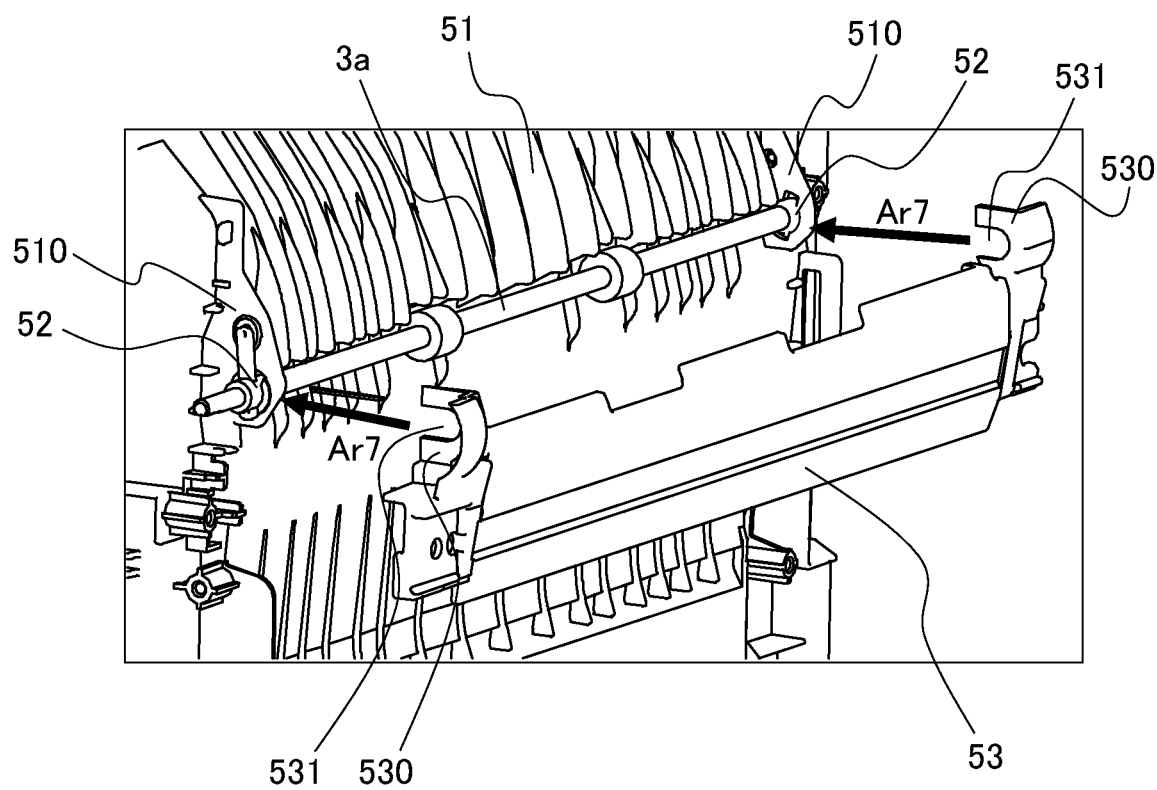
FIG. 12 is a perspective view for describing a positioning method of a white reference plate according to the third embodiment.

FIG. 12 illustrates a white reference plate 53 of the present embodiment. A pair of wall surface portions 530 are provided on respective outer sides of the sheet passage region of the white reference plate 53 in the sheet width direction, particularly respective end portions thereof in the sheet width direction. The wall surface portions 530 are each provided with a U-shaped groove 531 opening in an attachment direction of the white reference plate 53 to the maintenance door 51 indicated by an arrow Ar7, and the grooves 531 are defined in shapes and dimensions that fit with the outer circumferential surface of the bearings 52. Particularly, it is preferable that the bottom portion of the U-shaped grooves 531 is formed as a cylindrical surface of a semicircle of a diameter approximately equal to the outer diameter of the bearings 52 in accordance with the cylindrical outer circumferential surface of the bearings 52. The other details of the configuration and functions of the white reference plate 53 are substantially the same as those of the white reference plate 32 of the first embodiment.

When attaching the white reference plate 53 to the maintenance door 51, the white reference plate 53 is moved in the direction indicated by the arrow Ar7 to fit and position the grooves 531 with the bearings 52, and is fixed to the maintenance door 51 by using an unillustrated screw.

To be noted, the configuration is not limited to the configuration in which the white reference plate 53 is fixed by using a screw, and the configuration of pressurizing the white reference plate 53 by an elastic member as described in the second embodiment may be employed. In this case, the white reference plate 53 is configured to be swingable with the fitting portions between the bearings 52 and the grooves 531 as fulcrums or be slidable in the fitting portions.

In addition, the opening direction of the grooves 531 does not have to be the direction illustrated in FIG. 12. In the case where the opening direction is changed, the attachment direction indicated by the arrow Ar7 also changes in accordance with the opening direction. Further, the shape of the grooves 531 is not limited to the complete U shape, and a configuration in which, for example, the width of the grooves 531 on the opening side is smaller and the bearings 52 is pushed in while pushing open the grooves 531 at the time of assembly such that the grooves 531 tightly hold the bearings 52 may be employed.

According to the present embodiment, in a configuration in which the conveyance roller 3a and the white reference plate 53 are each supported by the maintenance door 51, the white reference plate 53 is positioned with respect to the shaft portion of the conveyance roller 3a attached to the maintenance door 51. Therefore, also in the configuration in which the maintenance door 51 supports the conveyance roller 3a, assembly can be performed with high precision of the relative positions of the white reference plate 53 and the conveyance roller 3a. Therefore, also according to the configuration of the present embodiment, similarly to the first embodiment, the sheet can be stably conveyed to the reading portion, and the reading precision can be improved.

In addition, according to the present embodiment, in the case of considering switching to a model not having an image reading function, the supporting elements of the conveyance roller 3a can be shared between the model of the present embodiment having the image reading function and the model not having the image reading function. Therefore, the number of parts that need to be replaced for changing the model can be reduced.

Fourth Embodiment

Next, a fourth embodiment will be described. The fourth embodiment is different from the first embodiment in that the white reference plate supports a plurality of conveyance rollers. In the description below, it is assumed that elements denoted by the same reference signs as in the first embodiment have substantially the same configuration and effect as in the first embodiment, and parts different from the first embodiment will be mainly described.

Figure 13:
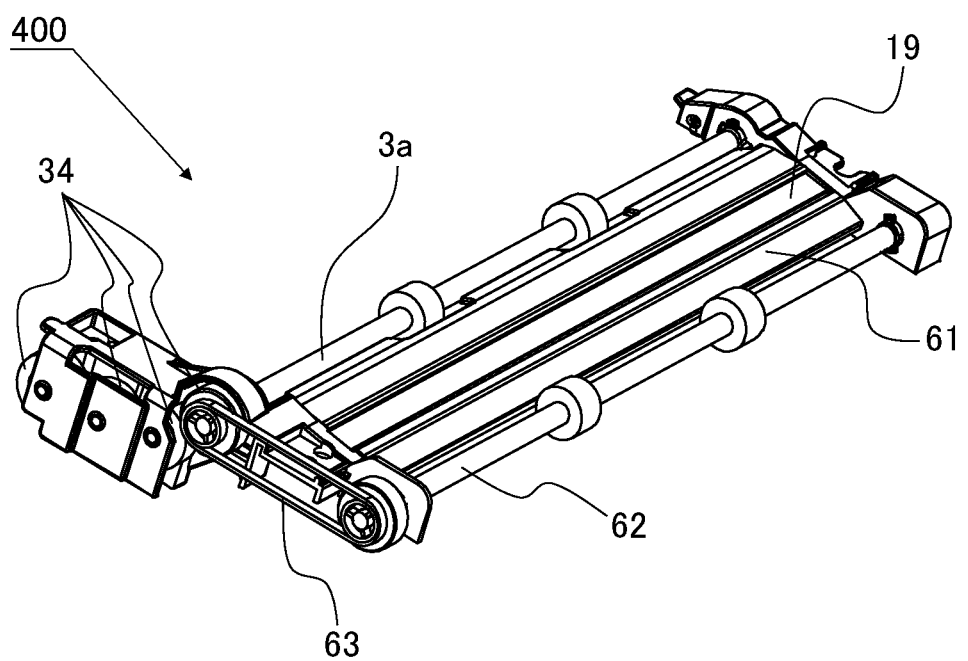
FIG. 13 is a perspective view of a white reference unit according to a fourth embodiment.

FIG. 13 is a perspective view of a white reference unit 400 according to the present embodiment. The white reference unit 400 includes a white reference plate 61, two conveyance rollers 3a and 62, a plurality of gears 34, and a timing belt 63. The conveyance roller 3a is a roller that constitutes the conveyance roller pair 3 illustrated in FIG. 1 upstream of the reading portion. In the present embodiment, a conveyance roller pair is added to a position between the conveyance roller pairs 3 and 5 and downstream of the reading portion in FIG. 1, and the conveyance roller 62 constitutes the conveyance roller pair downstream of the reading portion. That is, the conveyance roller 62 and an unillustrated driven roller disposed on the inner frame 18 of the apparatus body 1A illustrated in FIG. 1 constitute a conveyance roller pair that nips and conveys the sheet at a position downstream of the reading portion.

The white reference plate 61 rotatably supports both of the upstream conveyance roller 3a and the downstream conveyance roller 62. In addition, the white sheet 19 is stuck on the white reference plate 61, and the white reference plate 61 rotatably supports the plurality of gears 34 that transmit a driving force to the upstream conveyance roller 3a. The upstream conveyance roller 3a and the downstream conveyance roller 62 are drivably coupled together via the timing belt 63, and the two conveyance rollers 3a and 62 are rotationally driven by the driving force input through the gears 34. To be noted, a drive transmission mechanism other than the timing belt 63, such as a gear train, may be used.

Here, if the sheet conveyance speed of the downstream conveyance roller 62 is configured to be higher than the sheet conveyance speed of the upstream conveyance roller 3a, warpage of the sheet in the reading portion can be suppressed to further improve the precision of the read image. To be noted, the sheet conveyance speeds are peripheral speeds of the conveyance rollers 3a and 62 in the reading portion. For example, setting the outer diameter of the downstream conveyance roller 62 to be larger than the outer diameter of the upstream conveyance roller 3a can be considered. In addition, setting a speed ratio of the drive transmission mechanism such that the number of rotations of the downstream conveyance roller 62 is larger than the number of rotations of the upstream conveyance roller 3a, for example, by setting the outer diameters of pulley portions of the timing belt 63 to different values, can be considered.

According to the present embodiment, since a configuration in which the conveyance rollers 3a and 62 disposed upstream and downstream in the vicinity of the reading portion are each rotatably supported by the white reference plate 61 is employed, the precision of the positional relationship between the white reference plate 61 and the upstream and downstream conveyance rollers 3a and 62 can be improved. Therefore, the sheet can be conveyed to the reading portion more stably, and the reading precision can be improved. The other effects of unitization of the white reference plate are similar to that of the first embodiment.

OTHER EMBODIMENTS

Although an image reading apparatus incorporated in an image forming apparatus, particularly in a conveyance path for duplex image formation has been described in the embodiments described above, the present technique is also applicable to other image reading apparatuses. For example, the image reading apparatus may be disposed in a discharge path to a sheet processing apparatus or inside the sheet processing apparatus in an image forming apparatus or an image forming system in which the sheet processing apparatus that performs a process such as a binding process on a sheet on which an image has been formed by a main unit of the image forming apparatus is connected to the main unit.

In addition, for example, the embodiments described above may be applied to a white reference plate opposing a reading unit and a conveyance roller that conveys a document sheet toward a reading portion in an image reading apparatus that reads an image of the document sheet. Particularly, examples of image reading apparatuses to which the present technique is applicable include an image reading apparatus which includes a reading apparatus body including a reading unit, a white reference plate, a conveyance roller, and an ADF that feeds document sheets one by one, and in which the ADF is openable and closable with respect to the reading apparatus body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-080363, filed on Apr. 30, 2020, and 2021-063469, filed on Apr. 2, 2021, which are hereby incorporated by reference herein in their entirety.

What is claimed is:

1. An image forming apparatus comprising:
an image forming unit provided on a first conveyance path and configured to form an image on a sheet conveyed in the first conveyance path;
a reading unit provided on a second conveyance path and configured to read image information from a sheet conveyed in the second conveyance path, the second conveyance path branching from the first conveyance path, the sheet being conveyed to the second conveyance path in a case of forming an image on a second surface of the sheet opposite to a first surface of the sheet on which an image has been formed by the image forming unit;
an opposing member configured to oppose the reading unit with a space therebetween; and
a conveyance roller configured to convey the sheet through the space between the reading unit and the opposing member and rotatably supported by the opposing member.

2. The image forming apparatus according to claim 1, wherein the opposing member is attachable to and detachable from a casing of the image forming apparatus while supporting the conveyance roller.

3. The image forming apparatus according to claim 1, wherein the conveyance roller is provided upstream of the reading unit in a sheet conveyance direction.

4. The image forming apparatus according to claim 3,
wherein the conveyance roller is an upstream conveyance roller,
wherein the image forming apparatus further comprises a downstream conveyance roller provided downstream of the reading unit in the sheet conveyance direction, and
wherein the downstream conveyance roller is rotatably supported by the opposing member.

5. The image forming apparatus according to claim 1, further comprising
a drive transmission mechanism configured to transmit a driving force to the conveyance roller,
wherein the opposing member is attachable to and detachable from a casing of the image forming apparatus while supporting the conveyance roller and the drive transmission mechanism.

6. The image forming apparatus according to claim 5, wherein the opposing member comprises a cover portion configured to at least partially cover the drive transmission mechanism in a case where the opposing member is viewed from the reading unit side in a direction perpendicular to a rotation axis direction of the conveyance roller and a sheet conveyance direction of the conveyance roller.

7. The image forming apparatus according to claim 5, further comprising:
a second conveyance roller provided upstream or downstream of the conveyance roller in the second conveyance path and configured to be rotated by a driving force from a drive source; and
a distributing portion configured to transmit part of the driving force from the drive source to the drive transmission mechanism.

8. The image forming apparatus according to claim 7, wherein the drive transmission mechanism comprises a one-way clutch configured to block coupling between the distributing portion and the conveyance roller so as to reduce a conveyance speed difference between the conveyance roller and the second conveyance roller.

9. The image forming apparatus according to claim 1,
wherein the opposing member comprises a guide portion opposing the reading unit and configured to guide the sheet,
wherein the guide portion has a recess portion where an upstream end of the guide portion in a sheet conveyance direction is recessed toward a downstream side in the sheet conveyance direction,
wherein the conveyance roller comprises:
a roller shaft extending in a rotation axis direction of the conveyance roller; and
a roller body provided on an outer circumference of the roller shaft and configured to come into contact with the sheet, and wherein the roller body is positioned within the recess portion in the rotation axis direction, and overlaps with the guide portion as viewed in the rotation axis direction.

10. The image forming apparatus according to claim 1, wherein the opposing member comprises:
a guide portion opposing the reading unit and configured to guide the sheet; and
a metal plate provided on an opposite side to the reading unit with respect to the guide portion and configured to support the guide portion,
wherein the conveyance roller comprises:
a roller shaft extending in a rotation axis direction of the conveyance roller; and
a roller body provided on an outer circumference of the roller shaft and configured to come into contact with the sheet, and
wherein the image forming apparatus further comprises a grounding member configured to be in contact with both the metal plate and the roller shaft to electrically ground the metal plate and the roller shaft.

11. The image forming apparatus according to claim 1, further comprising:
an apparatus body configured to support the reading unit; and
an opening/closing member configured to support the opposing member and be openable and closable with respect to the apparatus body.

12. The image forming apparatus according to claim 11, wherein the reading unit is movably supported by the apparatus body so as to move closer to and away from the opposing member,
wherein movement of the opposing member with respect to the opening/closing member is restricted, and
wherein the image forming apparatus further comprises an elastic member configured to urge the reading unit toward the opposing member.

13. The image forming apparatus according to claim 11, wherein movement of the reading unit with respect to the apparatus body is restricted,
wherein the opposing member is movably supported by the reading unit so as to move closer to and away from the opposing member, and
wherein the image forming apparatus further comprises an elastic member configured to urge the reading unit toward the opposing member.

14. The image forming apparatus according to claim 11, wherein at least one of the reading unit and the opposing member comprises an abutting portion configured to abut the other of the reading unit and the opposing member to secure the space in a state in which the opening/closing member is closed.

15. The image forming apparatus according to claim 14, wherein the abutting portion is provided on each outer side of a passage region in a rotation axis direction of the conveyance roller, the passage region being a region which the sheet passes through in the space, and
wherein the opposing member includes a positioning portion configured to position the opposing member with respect to the opening/closing member, the positioning portion being provided on each outer side of the passage region in the rotation axis direction.

16. The image forming apparatus according to claim 11, wherein the conveyance roller is a first roller,
wherein the image forming apparatus further comprises a second roller supported by the apparatus body, and
wherein the first roller and the second roller are in contact with each other in a state in which the opening/closing member is closed, and constitute a conveyance roller pair configured to nip and convey the sheet.

17. The image forming apparatus according to claim 16, wherein the opening/closing member comprises a supporting portion supporting the opposing member from an opposite side to the reading unit in a direction perpendicular to a sheet conveyance direction and a rotation axis direction of the conveyance roller, and
wherein the supporting portion abuts the opposing member at a position in the sheet conveyance direction overlapping with a position of a rotation axis of the conveyance roller in the sheet conveyance direction.

18. The image forming apparatus according to claim 1, wherein the opposing member comprises a white sheet attached on a surface thereof opposing the reading unit.

19. The image forming apparatus according to claim 1, wherein the opposing member comprises a surface opposing the reading unit and formed from a white resin material.

20. The image forming apparatus according to claim 1, wherein the reading unit includes
a casing containing the reading unit,
an electric board which is attached to the casing and on which an image sensor is provided,
a rod lens array arranged to oppose the electric board so as to converge reflection light from the sheet on the image sensor, and
a contact glass attached to the casing and arranged to oppose the opposing member.

21. The image forming apparatus according to claim 1, wherein the opposing member is supported by an opening/closing member openable and closable with respect to an apparatus body of the image forming apparatus.

22. An image forming apparatus comprising:
an image forming unit provided on a first conveyance path and configured to form an image on a sheet conveyed in the first conveyance path;
a reading unit provided on a second conveyance path and configured to read image information from the sheet conveyed from the first conveyance path to the second conveyance path, the second conveyance path branching from the first conveyance path;
an opposing member configured to oppose the reading unit with a space therebetween; and
a conveyance roller configured to convey the sheet through the space between the reading unit and the opposing member and rotate about a roller shaft supported by a casing of the image forming apparatus,
wherein the opposing member is positioned with respect to the roller shaft.

* * * * *